United States Patent
Cortright et al.

(10) Patent No.: US 6,964,757 B2
(45) Date of Patent: *Nov. 15, 2005

(54) LOW-TEMPERATURE HYDROGEN PRODUCTION FROM OXYGENATED HYDROCARBONS

(75) Inventors: Randy D. Cortright, Madison, WI (US); James A. Dumesic, Verona, WI (US)

(73) Assignee: Wisconsin Alumni Research, Madison, WI (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/306,258

(22) Filed: Nov. 27, 2002

(65) Prior Publication Data

US 2003/0170171 A1 Sep. 11, 2003

Related U.S. Application Data

(63) Continuation-in-part of application No. 09/998,552, filed on Nov. 29, 2001, now Pat. No. 6,699,457.

(51) Int. Cl.[7] .................................................. C01B 3/02
(52) U.S. Cl. ................................................. 423/648.1
(58) Field of Search ............................ 423/648.1, 650, 423/651, 652, 653, 654

(56) References Cited

U.S. PATENT DOCUMENTS

| 5,651,953 A | 7/1997 | Yokoyama et al. |
| 5,861,137 A | 1/1999 | Edlund |
| 6,059,995 A | 5/2000 | Topsoe et al. |
| 6,171,992 B1 | 1/2001 | Autenrieth et al. |
| 6,207,132 B1 | 3/2001 | Lin et al. |
| 6,221,117 B1 | 4/2001 | Edlund et al. |
| 6,280,701 B1 | 8/2001 | Autenrieth et al. |
| 6,361,757 B1 | 3/2002 | Shikada et al. |
| 6,413,449 B1 | 7/2002 | Wieland et al. |
| 6,699,457 B2 * | 3/2004 | Cortright et al. ......... 423/648.1 |

FOREIGN PATENT DOCUMENTS

WO    WO 99/48804 A1    9/1999

OTHER PUBLICATIONS

Brown et al, Carbon–Halogen Bond Scission and Rearrangement of β–Halohydrins on the Rh(111) Surface, *J. Phys. Chem.*, 98:12737–12745 (1994), no month.

B. Lindstrom & L. J. Pettersson, *Int. J. Hydrogen Energy* 26(9), 923 (2001), no month.

(Continued)

*Primary Examiner*—Wayne A. Langel
(74) *Attorney, Agent, or Firm*—Joseph T. Leone, Esq.; DeWitt Ross & Stevens S.C.

(57) ABSTRACT

Disclosed is a method of producing hydrogen from oxygenated hydrocarbon reactants, such as methanol, glycerol, sugars (e.g. glucose and xylose), or sugar alcohols (e.g. sorbitol). The method takes place in the condensed liquid phase. The method includes the steps of reacting water and a water-soluble oxygenated hydrocarbon in the presence of a metal-containing catalyst. The catalyst contains a metal selected from the group consisting of Group VIIIB transitional metals, alloys thereof, and mixtures thereof. The disclosed method can be run at lower temperatures than those used in the conventional steam reforming of alkanes.

40 Claims, 21 Drawing Sheets

OTHER PUBLICATIONS

Kawai et al., Production of Hydrogen and Hyrdrocarbon From Cellulose and Water, *Chemistry Letters*, pp. 1185–1188 (1981), no month.

Minowa et al., Hydrogen Production from Wet Cellulose by Low Temperature Gasification Using a Reduced Nickel Catalyst, *Chemistry Letters*, pp. 937–938 (1995), no month.

Minowa et al., Hydrogen Production from Cellulose in Hot compressed Water Using Reduced Nickel Catalyst: Product Distribution at Different Reaction Temperatures, *Journal of Chemical Engineering of Japan*, vol. 1, No. 3, pp. 488–491 (1998), no month.

J. Rostrup–Noelsen, Conversion of hydrocarbons and alcohols for fuel cells, *Phys. Chem. Chem. Phys.* 3, 283 (2001), no month.

Usui et al., Selective Hydrogen Production from Cellulose at Low Temperature Catalyzed by Supported Group 10 Metal, *Chemistry Letters*, pp. 1166–1167 (2000), no month.

Wang et al., Catalytic steam reforming of biomass–derived oxygenates: acetic acid and hydroxyavetaldehyde, *Applied Catalysis A: General* 143, 245–270 (1996), no month.

* cited by examiner

LOW-TEMPERATURE HYDROGEN PRODUCTION FROM OXYGENATED HYDROCARBONS

CROSS-REFERENCE TO RELATED APPLICATIONS

This is a continuation-in-part of, and priority is hereby claimed to, application Ser. No. 09/998,552, filed Nov. 29, 2001, and issued Mar. 2, 2004 as U.S. Pat. No. 6,699,457, which application is incorporated herein by reference.

FEDERAL FUNDING STATEMENT

This invention was made with United States government support awarded by DOE Grant No. DE-FG02-84ER13183. The United States has certain rights in this invention.

FIELD OF THE INVENTION

The invention is directed to a method of producing hydrogen ($H_2$) by condensed, liquid-phase reforming of oxygenated hydrocarbons such as methanol, ethylene glycol, sugars, and the like.

BACKGROUND OF THE INVENTION

Fuel cells have emerged as one of the most promising new technologies for meeting future global energy needs. In particular, fuel cells that consume hydrogen are proving to be environmentally clean, quiet, and highly efficient devices for power generation. However, while hydrogen fuel cells have a low impact on the environment, the current methods for producing hydrogen require high-temperature steam reforming of non-renewable hydrocarbon fuels. Further still, these high-temperature methods produce significant amounts of polluting emissions and greenhouse gases such as carbon dioxide ($CO_2$).

A key challenge for promoting and sustaining the vitality and growth of the fuel cell industry (as well as the entire industrial sector of society) is to develop efficient and environmentally benign technologies for generating fuel, such as hydrogen, from renewable resources. Notably, if hydrogen fuel for consumption in fuel cells can be generated efficiently from renewable sources, then non-renewable resources such as petroleum feedstocks can be used for other, less environmentally deleterious purposes. Moreover, the generation of energy from renewable resources such as biomass, reduces the net rate of production of carbon dioxide, an important greenhouse gas that contributes to global warming. This is because the biomass itself, i.e., plant material, consumes carbon dioxide during its life cycle.

At present, the vast majority of hydrogen production is accomplished via steam reforming of a hydrocarbon (usually methane) over a suitable catalyst. Conventional steam reforming takes place at considerably elevated temperatures, generally from about 400° C. to 700° C. or even higher (673 to 937 K and higher).

The net desired steam reformation reaction of a hydrocarbon is shown in reaction (1). The reaction requires a catalyst, conventionally a nickel-based catalyst on a modified alumina support.

$$C_xH_{2x+2} + xH_2O \rightarrow xCO + (2x+1)H_2 \quad (1)$$

The nickel catalyst is sensitive to sulfur poisoning, which can be problematic. Hydrocarbon feedstocks produced from petroleum contain a significant amount of sulfur. Therefore, the hydrocarbon reactants must have the contaminating sulfur removed prior to undergoing steam reforming.

Conventional steam reforming is generally followed by one or more water-gas shift (WGS) reactions (reaction (2)) that take place in a second and perhaps a third reactor.

$$CO + H_2O \rightarrow CO_2 + H_2 \quad (2)$$

The WGS reaction uses steam to convert the carbon monoxide produced in reaction (1) to carbon dioxide and hydrogen. The WGS reaction is thus used to maximize the production of hydrogen from the initial hydrocarbon reactants.

An entire, and typical, prior art process for the steam reformation of methane is illustrated schematically in FIG. 1. The hydrocarbon feedstock is first desulfurized at 10. The desulfurized feedstock is then subjected to a first high-temperature, vapor-phase reforming reaction in a first high-temperature reaction chamber at 12. As noted earlier, this reaction generally uses a nickel-based catalyst. The products of the reaction at 12 are then swept into a second reactor for a first WGS reaction 14. This first WGS reaction takes place at approximately 300° C. to 350° C., using an iron catalyst. The products of the reaction at 14 are swept into a third reactor for a second WGS reaction 16. This second WGS reaction takes place a reduced temperature of from about 200° C. to 250° C. The products of the reaction at 16 are then passed through a separator 18, where the products are separated into two streams: $CO_2$ and $H_2O$ (the water which is pumped back into the reaction cycle at the beginning) and CO and $H_2$. The CO and $H_2$ stream from the separator 18 may also be subjected (at 20) to a final methanation reaction (to yield $CH_4$ and $H_2$) or an oxidation reaction to yield $CO_2$ and $H_2$.

It has been reported that it is possible to produce hydrogen via steam reformation of methanol at temperatures near 277° C. (550 K). See B. Lindstrom & L. J. Pettersson, *Int. J. Hydrogen Energy* 26(9), 923 (2001), and J. Rostrup-Nielsen, *Phys. Chem. Chem. Phys.* 3, 283 (2001). The approach described in these references uses a copper-based catalyst. These catalysts, however, are not effective to steam reform heavier hydrocarbons because the catalysts have very low activity for cleavage of C—C bonds. Thus, the C—C bonds of heavier hydrocarbons will not be cleaved using these types of catalysts.

Wang et al., *Applied Catalysis A: General* 143, 245–270 (1996), report an investigation of the steam reformation of acetic acid and hydroxyacetaldehyde to form hydrogen. These investigators found that when using a commercially available nickel catalyst (G-90C from United Catalysts Inc, Louisville, Ky.), acetic acid and hydroxyacetaldehyde can be reformed to yield hydrogen in high yield only at temperatures at or exceeding 350° C. Importantly, the nickel catalyst was observed to deactivate severely after a short period of time on stream.

A hydrogen-producing fuel processing system is described in U.S. Pat. No. 6,221,117 B1, issued Apr. 24, 2001. The system is a steam reformer reactor to produce hydrogen disposed in-line with a fuel cell. The reactor produces hydrogen from a feedstock consisting of water and an alcohol (preferably methanol). The hydrogen so produced is then fed as fuel to a proton-exchange membrane (PEM) fuel cell. Situated between the reactor portion of the system and the fuel cell portion is a hydrogen-selective membrane that separates a portion of the hydrogen produced and routes it to the fuel cell to thereby generate electricity. The by-products, as well as a portion of the hydrogen, produced in the reforming reaction are mixed with air, and passed over a combustion catalyst and ignited to generate heat for running the steam reformer.

Conventional steam reforming has several notable disadvantages. First, the hydrocarbon starting materials contain sulfur which must be removed prior to steam reformation. Second, conventional steam reforming must be carried out in the vapor phase, and high temperatures (greater than 500° C.) to overcome equilibrium constraints. Because steam reformation uses a considerable amount of water which must also be heated to vaporization, the ultimate energy return is far less than ideal. Third, the hydrocarbon starting materials conventionally used in steam reforming are highly flammable. The combination of high heat, high pressure, and flammable reactants make conventional steam reforming a reasonably risky endeavor.

Thus, there remains a long-felt and unmet need to develop a method for producing hydrogen that utilizes low sulfur content, renewable, and perhaps non-flammable starting materials. Moreover, to maximize energy output, there remains an acute need to develop a method for producing hydrogen that proceeds at a significantly lower temperature than conventional steam reforming of hydrocarbons derived from petroleum feedstocks. Lastly, there remains a long-felt and unmet need to simplify the reforming process by developing a method for producing hydrogen that can be performed in a single reactor, and in the condensed phase, rather than in the vapor phase.

SUMMARY OF THE INVENTION

The invention is directed to a method of producing hydrogen via the reforming of an oxygenated hydrocarbon feedstock. The method comprises reacting water and a water-soluble oxygenated hydrocarbon, in the condensed phase, in the presence of a metal-containing catalyst. The catalyst comprises a metal selected from the group consisting of Group VIII transitional metals, alloys thereof, and mixtures thereof.

Thus, the preferred embodiment of the invention is a method of producing hydrogen via condensed-phase reforming, wherein the method comprises first reacting water and a water-soluble oxygenated hydrocarbon in the condensed phase. The reaction takes place in the presence of a metal-containing catalyst, wherein the catalyst comprises a metal selected from the group consisting of Group VIIIB transitional metals, alloys thereof, and mixtures thereof. As noted below, it is preferred that the water and the oxygenated hydrocarbon are reacted at a temperature not greater than about 400° C., and at a pressure wherein the water and the oxygenated hydrocarbon remain condensed liquids, and more preferably still at a temperature not greater than about 300° C.

It is preferred that the water and the oxygenated hydrocarbon are reacted at a pH of from about 4.0 to about 10.0.

The preferred catalysts for use in the inventive method comprise a metal selected from the group consisting of nickel, palladium, platinum, ruthenium, rhodium, iridium, alloys thereof, and mixtures thereof. The catalyst may optionally be further alloyed or mixed with a metal selected from the group consisting of Group IB metals, Group IIB metals, Group VIIB metals, Group IVA metals, and Group VA metals (the preferred optional metals being copper, zinc, germanium, tin, and bismuth. The catalyst may also be optionally adhered to a support, the preferred supports being selected from the group consisting of silica, alumina, zirconia, titania, ceria, carbon, silica-alumina, silica nitride, boron nitride, and mixtures thereof. The support itself may optionally be surface-modified to remove surface moieties such as hydrogen and hydroxyl. This optional modification can be accomplished by treating the support with a modifier such silanes, alkali compounds, and alkali earth compounds. Trimethylethoxysilane is preferred.

The support can take many forms, such as beads, powders, zeolites, carbon nanotubes, carbon fullerenes, or nanoporous supports.

In additional to the reaction conditions noted above, the reaction may further be conducted by reacting the water and the water-soluble oxygenated hydrocarbon in the presence of a water-soluble salt of an alkali or alkali earth metal, such as an alkali or an alkali earth metal hydroxide, carbonate, nitrate, or chloride salt.

In the preferred embodiment, the water-soluble oxygenated hydrocarbon has a carbon-to-oxygen ratio of 1:1, and has from 2 to 12 carbon atoms. Oxygenated hydrocarbons outside these ranges are explicitly encompassed within the scope of the invention, but are not preferred.

Particularly preferred oxygenated hydrocarbons include methanol, ethanediol, ethanedione, glycerol, glyceraldehyde, aldotetroses, aldopentoses, aldohexoses, ketotetroses, ketopentoses, ketohexoses, and alditols. From among the oxygenated hydrocarbons having six carbon atoms, glucose, sucrose, and sorbitol are preferred. Ethanediol, glycerol, and glyceraldehyde are the preferred oxygenated hydrocarbons from among those having less than six carbon atoms.

The invention will also function with mixed feedstocks of oxygenated hydrocarbons, that is, feedstocks containing mixtures of two or more oxygenated hydrocarbons.

The present invention thus provides methods for producing hydrogen via a low-temperature, catalytic reforming of oxygenated hydrocarbon compounds such as methanol, ethanediol, glycerol, sorbitol, glucose, and other water-soluble carbohydrates. For the purpose of the present invention, "reforming" or "steam reforming" is defined as the reaction of an oxygenated hydrocarbon feedstock to yield hydrogen and carbon dioxide.

A principal advantage of the subject invention is that the oxygenated hydrocarbon reactants can be produced from renewable resources, such as biomass. Thus, the present method can be used to generate a fuel source, namely hydrogen, from an abundant and fully renewable source. Also, because living plant matter consumes carbon dioxide, the use of these feedstocks in power generation applications does not result in a net increase of carbon dioxide vented to the atmosphere.

Another equally important advantage of the present method is that it functions at a much lower temperature than conventional steam reforming of hydrocarbons. Conventional steam reforming of hydrocarbons requires operating temperatures greater than about 500° C. (773 K). The subject method, however, is able reform aqueous solutions of oxygenated hydrocarbons to yield hydrogen, at temperatures generally not greater than about 400° C. Preferably, the reaction is carried out at temperatures not greater than about 300° C. Carrying out the reaction at temperatures greater than 400° C. is explicitly within the scope of the invention, although running the reaction at such temperatures is not preferred.

Another beneficial aspect of the present invention is that it allows for the reforming of the oxygenated hydrocarbon and a simultaneous WGS reaction to take place in a single reactor.

Another distinct advantage of the present invention is that oxygenated hydrocarbons are far less dangerous than are the conventional hydrocarbons normally used in steam reformation. Thus, the present invention yields hydrogen from such relatively innocuous substances as ethanediol, glycerol, glucose, and sorbitol (as compared to the highly flammable methane or propane that are used in conventional reforming methods).

Still another advantage of the present invention is that because the method is carried out in the condensed liquid phase, it eliminates the need to vaporize water to steam. This is a critical concern in large-scale operations due to the high energy costs required to vaporize large amounts of water. The heat of vaporization of water is more than 2000 kJ per mole. By eliminating the need to vaporize the water, the amount of energy that must be input into the claimed method to yield hydrogen is greatly reduced. The overall energy yield, therefore, is concomitantly increased.

Thus, the subject method provides a means to convert oxygenated hydrocarbons to yield hydrogen, using a single reactor bed and reactor chamber, and at low temperatures. Such a reactor system can be fabricated at a reduced volume and can be used to produce hydrogen that is substantially free of contaminates for use in portable fuel cells or for use in applications in remote locations.

The hydrogen produced using the present invention can be utilized in any process where hydrogen is required. Thus, the hydrogen can be used, for example, as a fuel for fuel cells. The hydrogen can be used for producing ammonia, or it could be used in the refining of crude oil. The method yields a hydrogen stream that has very low sulfur content. When low sulfur content reactants are utilized, the method yields a hydrogen stream that is substantially free of both sulfur and carbon monoxide. This type of hydrogen stream is highly suitable for use in fuel cells, where sulfur and/or carbon monoxide can poison the catalysts located at the electrodes of each fuel cell.

DETAILED DESCRIPTION OF THE INVENTION

Figure 1:
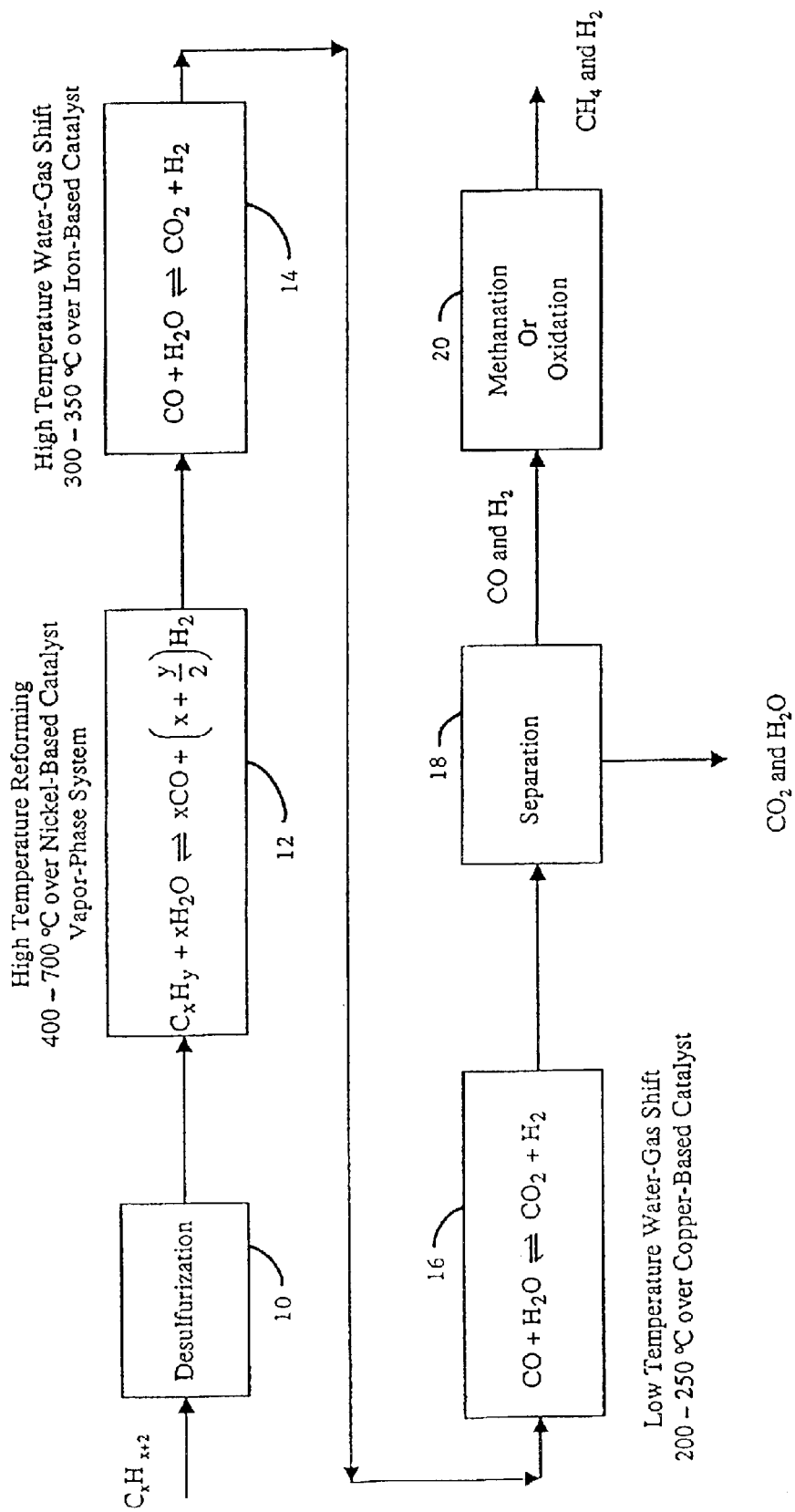
FIG. 1 is a schematic diagram of a PRIOR ART method of steam reforming a hydrocarbon feedstock to yield hydrogen.

The present invention is an energy efficient method for steam reforming oxygenated hydrocarbons at considerably lower temperatures than previously possible. The reaction can take place in the vapor phase, in the same fashion as conventional steam reforming reactions (although at a much lower temperature). The reaction can also take place in the condensed liquid phase, in which case the reactants (water and an oxygenated hydrocarbon) remain condensed liquids, as opposed to being vaporized prior to reaction.

As used herein to describe the present invention, the terms "reforming," "steam reforming," and "steam reformation" are synonymous. These terms shall generically denote the overall reaction of an oxygenated hydrocarbon and water to yield a hydrogen stream, regardless of whether the reaction takes place in the gaseous phase or in the condensed liquid phase. Where the distinction is important, it shall be so noted.

When the steam reforming of oxygenated hydrocarbons is carried out in the liquid phase, the present invention makes it possible to produce hydrogen from aqueous solutions of oxygenated hydrocarbons having limited volatility, such as glucose and sorbitol.

Abbreviations and Definitions:
"GC"=gas chromatograph or gas chromatography.
"GHSV"=gas hourly space velocity.
"psig"=pounds per square inch relative to atmospheric pressure (i.e., gauge pressure).
"Space Velocity"=the mass/volume of reactant per unit of catalyst per unit of time.
"TOF"=turnover frequency.
"WHSV"=weight hourly space velocity=mass of oxygenated compound per mass of catalyst per h.
"WGS"=water-gas shift.

Thermodynamic Considerations:

As noted above, the stoichiometric reaction for steam reforming of alkanes to yield hydrogen and carbon monoxide is given by reaction (1):

$$C_xH_{2x+2}+xH_2O \rightarrow xCO+(2x+1)H_2 \quad (1)$$

The stoichiometric reaction for steam reforming of carbon monoxide to yield hydrogen and carbon dioxide is given by the water-gas shift (WGS) reaction, reaction (2):

$$CO+H_2O \rightarrow CO_2+H_2 \quad (2)$$

The stoichiometric reaction for steam reforming of an oxygenated hydrocarbon having a carbon-to-oxygen ration of 1:1 is given by reaction (3):

$$C_xH_{2y}O_x \rightarrow nCO+yH_2 \quad (3)$$

Figure 2:
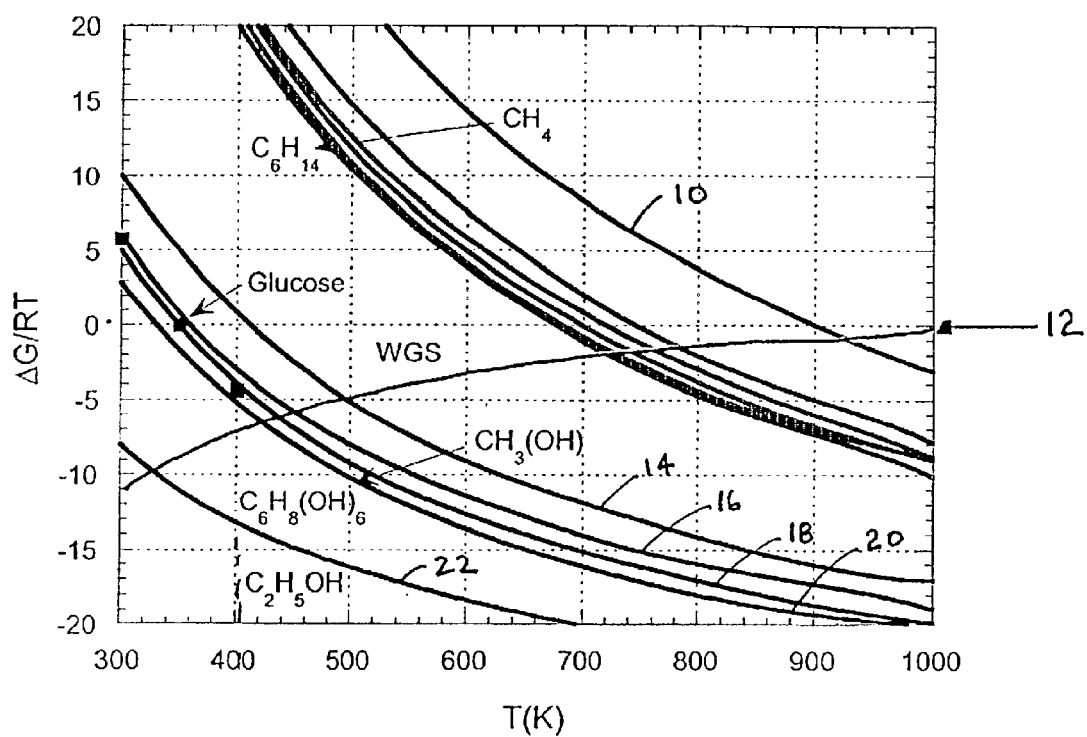
FIG. 2 is a graph depicting the thermodynamics for the conversion of hydrocarbons and oxygenated hydrocarbons to carbon monoxide and hydrogen ($H_2$).

FIG. 2 is a graph depicting the changes in the standard Gibbs free energy ($\Delta G°$) associated with reaction (1) and (3) for a series of alkanes ($CH_4$, $C_2H_6$, $C_3H_8$, $C_4H_{10}$, $C_5H_{12}$, and $C_6H_{14}$) and oxygenated hydrocarbons having a carbon-to-oxygen ratio of 1:1 ($CH_3OH$, $C_2H_4(OH)_2$, $C_3H_5(OH)_3$, and $C_6H_8(OH)_6$). The values plotted in FIG. 2 have been normalized per mole of CO. The $\Delta G°$ data points shown in FIG. 2 have been divided by RT. Thus, FIG. 2 is a plot having $\Delta G°/RT$ on the Y-axis and temperature (in Kelvins) on the X-axis. It can be seen from FIG. 2 that the steam reforming of $C_1$ to $C_6$ alkanes to produce CO and $H_2$ is thermodynamically favorable (i.e., $\Delta G°$ is negative) at significantly higher temperatures than those required for the steam reforming of the oxygenated hydrocarbons having the same number of carbon atoms.

For example, the steam reforming of methane, trace 10 in FIG. 2, becomes thermodynamically favorable only at temperatures above about 900 K. In contrast, the steam reforming of the oxygenated hydrocarbons (traces 14, 16, 18, 20, and 22) is favorable at temperatures above about 400 K.

Reactions (4) and (5) represent the reforming of $CH_2$ groups in alkanes as compared to $CH(OH)$ groups in oxygenated hydrocarbons:

$$C_3H_8+H_2O \rightarrow C_2H_6+CO+2H_2 \quad (4)$$

$$C_3H_8O_3 \rightarrow C_2H_6O_2+CO+H_2 \quad (5)$$

The value of $\Delta G°/RT$ for reaction (4), involving $CH_2$ groups, is equal to zero at a temperature of about 635 K. In contrast, $\Delta G°/RT$ for reaction (5), involving—$CH(OH)$ groups, is equal to zero at a temperature of about 320 K. Thus, according to the present invention, the steam reforming of oxygenated hydrocarbons, especially hydrocarbons having a carbon-to-oxygen ratio of 1:1 (the preferred ratio) is thermodynamically favorable at temperatures far lower than the analogous steam reforming reaction of alkanes.

FIG. 2 also shows that the value of $\Delta G°$ for the WGS reaction (reaction (3), trace 12 of FIG. 2) is more favorable at lower temperatures. This reveals that the conversion of CO (produced in reactions (1) and (2)) to $CO_2$ and $H_2$ is more favorable at the lower temperatures associated with the reforming of oxygenated hydrocarbons. Therefore, the steam reforming of oxygenated hydrocarbons provides a low-temperature route to the formation of $CO_2$ and $H_2$, provided that appropriate catalysts are developed for operation at these low temperature reaction conditions.

As a general proposition (albeit with several exceptions), the rate of cleavage of C—H bonds on metal surfaces is faster than the cleavage of C—C bonds on metal surfaces. Accordingly, the steam reforming of, for example, methanol to produce CO and $H_2$, would be expected to be relatively facile compared to the reforming of ethanediol (i.e., ethylene glycol) to yield the same product mix. In the case of methanol, the general proposition holds true: The steam reforming of methanol can be achieved at low temperatures over catalysts (such as copper) that do not readily cleave C—C bonds. In contrast, the steam reforming of ethanediol will not readily take place under these conditions using the same copper catalysts because the catalyst does not effectively catalyze the cleavage of C—C bonds.

Also, because methanol itself is typically produced from a CO and $H_2$ stream that is derived from petroleum processing, the steam reforming of methanol does not represent the production of energy from a renewable resource. For this reason, appropriate catalysts for use in the present invention must show good activity for the cleavage of C—C bonds.

The thermodynamic trends shown in FIG. 2 also indicate that appropriate catalysts for use in the present invention must not show high activity for the cleavage of C—O bonds. Consider, for example, the steam reforming of ethanediol, reaction (6), followed by cleavage of the C—O bond in carbon monoxide to form methane and water, reaction (7), leading to the overall process given by reaction (8):

$$C_2H_4(OH)_2 \rightarrow 2CO+3H_2 \, \Delta G°/RT=-14 \text{(at 470K)} \quad (6)$$

$$CO+3H_2 \rightarrow CH_4+H_2O \, \Delta G°/RT=-26 \text{(at 470K)} \quad (7)$$

$$C_2H_4(OH)_2 \rightarrow CO+CH_4+H_2O \, \Delta G°/RT=-40 \text{(at 470K)} \quad (8)$$

Because reaction (7) is the reverse of the steam reforming of methane, it is apparent from FIG. 2 that reaction (7) becomes very favorable at low temperatures. Thus, for example, at a temperature of 470 K, the values of $\Delta G°/RT$ for reactions (6) and (7) are equal to –14 and –26, respectively. This leads to a very favorable $\Delta G°/RT$ value of –40 for the overall reaction (8). Therefore, a reforming catalyst that is readily able to cleave C—C and C—O bonds would convert ethanediol at low temperatures to a mixture of CO and $CH_4$, instead of the desired product mixture of CO and $H_2$. The CO and $H_2$ product mixture is preferred because it is followed by the production of $CO_2$ and $H_2$ by the WGS reaction. Clearly then, the production of $CH_4$ is undesirable for a fuel cell application because the production of $CH_4$ creates a significant loss of $H_2$ from the system.

The above behavior for steam reforming of oxygenated hydrocarbons having a carbon-to-oxygen ratio of 1:1 can be extended to the reforming at low temperatures of oxygenated hydrocarbons having a carbon-to-oxygen ratio higher than 1:1. In particular, upon reforming, these oxygenated hydrocarbons having higher carbon-to-oxygen ratios yield CO and $H_2$, plus the formation of the appropriate alkane. For example, consider the conversion of ethanol according to the following reaction:

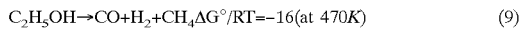

$$C_2H_5OH \rightarrow CO+H_2+CH_4 \Delta G°/RT=-16 \text{(at } 470K) \qquad (9)$$

It can be seen from in FIG. 2, trace 22, that reaction (9) is very favorable at low temperatures. At 470 K, the value of $\Delta G°/RT$ for reaction (9) is equal to –16. Thus, according to the present invention, a catalyst is used to convert ethanol at low temperatures to produce $H_2$ (which can be used for any purpose, such as to power a fuel cell) and to co-generate methane for some other application (such as a combustion process to produce heat). To achieve this co-generation operation, however, it is necessary that the catalyst does not facilitate the reaction of ethanol with $H_2$ to produce ethane:

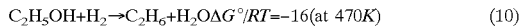

$$C_2H_5OH+H_2 \rightarrow C_2H_6+H_2O \Delta G°/RT=-16 \text{(at } 470K) \qquad (10)$$

As noted, at 470 K, the value of $\Delta G°/RT$ for reaction (10) is –24, a value more negative than that for reaction 9. This again demonstrates the importance that the catalyst to be used in the present invention should not show high activity for the cleavage of C—O bonds.

Figure 3:
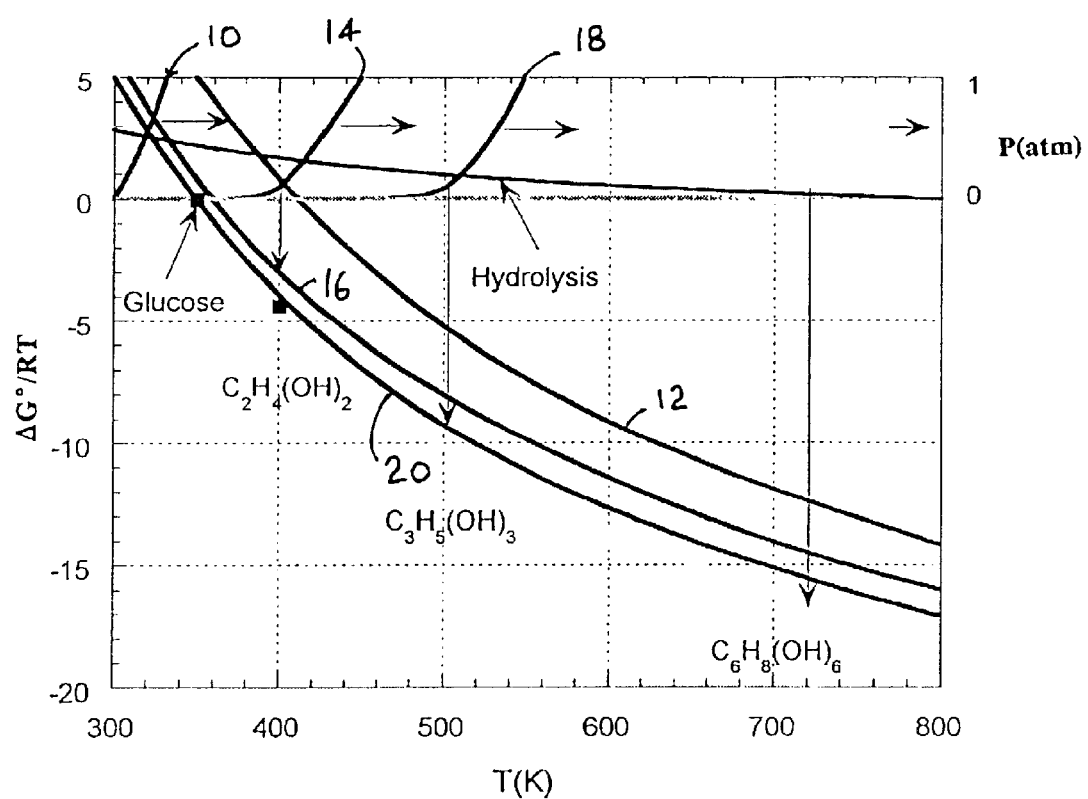
FIG. 3 is a graph depicting, on the same temperature scale, the thermodynamics for the conversion of oxygenated hydrocarbons to carbon monoxide and $H_2$, and the vapor pressures of the oxygenated hydrocarbon reactants as a function of temperature.

Vapor-phase Reforming vs. Condensed Liquid-phase Reforming:

The steam reforming of hydrocarbons typically takes place in the vapor phase. Therefore, the vapor-phase steam reforming at low temperatures of oxygenated hydrocarbons may (under certain circumstances) be limited by the vapor pressure of the reactants. FIG. 3 is a graph that depicts, on the same temperature scale, the vapor pressure of various oxygenated hydrocarbons as a function of temperature and the thermodynamics of these same oxygenated hydrocarbons in the reforming reaction yielding CO and $H_2$. The upper portion of FIG. 3 shows plots of the vapor pressure (atm) versus temperature (K) for oxygenated hydrocarbons having a carbon-to-oxygen ratio of 1:1 ($CH_3OH$, $C_2H_4(OH)_2$, $C_3H_5(OH)_3$, and $C_6H_8(OH)_6$). The lower portion of FIG. 3 shows plots of $\Delta G°/RT$ versus temperature for these same reactants.

In evaluating FIG. 3, assume (for sake of simplicity) that the vapor pressure of the hydrocarbon reactant should be higher than about 0.1 atm for economically-feasible vapor-phase steam reforming. Thus, as it can be seen in FIG. 3, low-temperature steam reforming of methanol (vapor pressure=trace 10, $\Delta G°/RT$=trace 12) is not fundamentally limited by the vapor pressure of the methanol reactant, but is fundamentally limited by the value of $\Delta G°/RT$ for the corresponding stoichiometric reaction. This is because a vapor pressure of 0.1 atm of methanol is achieved at a lower temperature (290 K) than the temperature at which $\Delta G°/RT$ becomes equal to zero (410 K). Thus, at the temperature where $\Delta G°/RT$ becomes favorable for the steam reforming of methanol (410 K), the methanol is already entirely vaporized.

In contrast, the vapor-phase steam reforming of heavier oxygenated hydrocarbons may be limited by the vapor pressure of these reactants. For example, it can be seen in FIG. 3 that the vapor-phase steam reforming of ethanediol (traces 14 and 16) and glycerol (traces 18 and 20) should be carried out at temperatures higher than about 400 K and 500 K, respectively. In contrast to these moderate temperatures, the vapor-phase steam reforming of sorbitol must be carried out at temperatures higher than about 700 K, a temperature at which the vapor pressure of sorbitol is roughly 0.1 atm.

Figure 4:
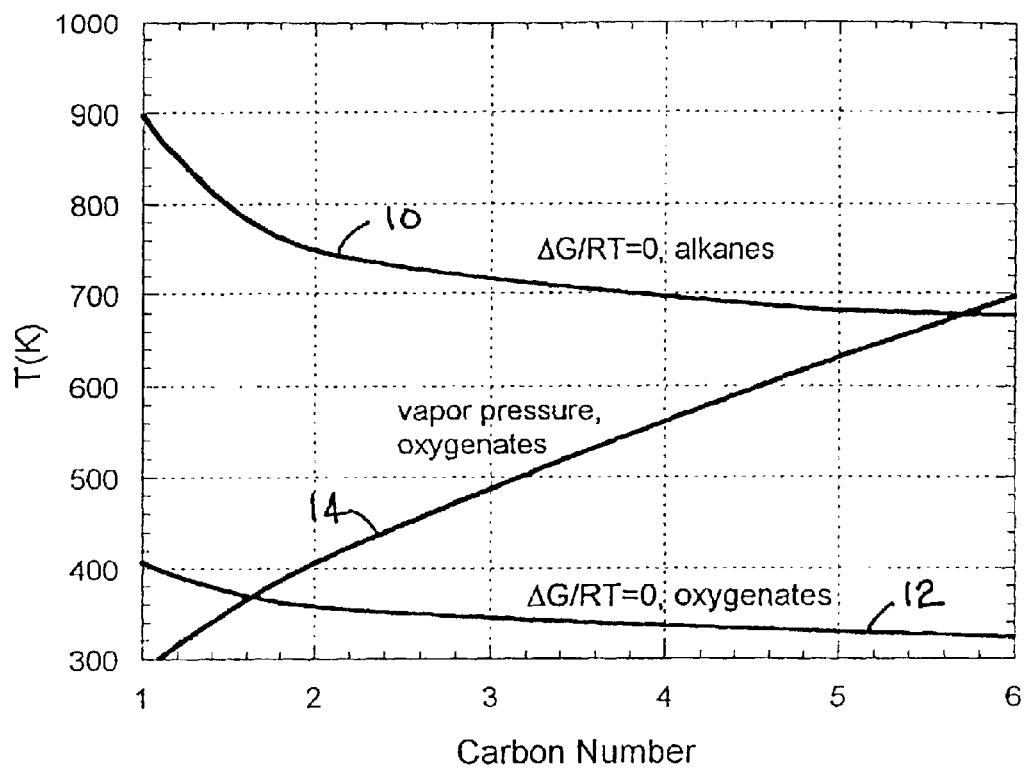
FIG. 4 is a graph depicting the temperature at which $\Delta G°/RT$ is equal to zero versus the number of carbons in the reactants for the steam reforming alkanes (trace 10) and oxygenated hydrocarbons (trace 12) having a carbon-to-oxygen ratio of 1:1. This figure also includes a plot (trace 14) of the temperature at which the vapor pressure of the oxygenated hydrocarbons is equal to 0.1 atm.

FIG. 4 is a graph depicting the temperature (K, on the Y-axis) at which $\Delta G°/RT$ is equal to zero versus the number of carbons in the reactants for the steam reforming alkanes (trace 10) and oxygenated hydrocarbons (trace 12) having a carbon-to-oxygen ratio of 1:1. This figure also includes a plot (trace 14) of the temperature at which the vapor pressure of the oxygenated hydrocarbons is equal to 0.1 atm. As shown in FIG. 3, the plots superimposing $\Delta G°/RT$ and vapor pressure intersect at carbon numbers between 1 and 2 for these oxygenated hydrocarbons (that is, between methanol and ethanediol). A close analysis of FIG. 4 indicates the following points: (1) the vapor-phase reforming of methanol (1 carbon atom) can be carried out at temperatures that are lower by about 500 K as compared to methane; (2) the vapor-phase reforming of ethanediol (2 carbon atoms) can be carried out at temperatures that are lower by about 340 K as compared to ethane; and, (3) the vapor-phase reforming of glycerol (i.e., propanetriol, 3 carbon atoms) can be carried out at temperatures that are lower by about 230 K as compared to propane.

In contrast to these lighter oxygenated hydrocarbons, the vapor-phase reforming of sorbitol (6 carbon atoms) must be carried out at temperatures that are similar to those for hexane, roughly 680 to 700 K. Thus, there is a tremendous energy advantage in vapor-phase reforming of short-chain oxygenated hydrocarbons as compared to the corresponding alkanes. The advantage in operating at lower temperatures for vapor-phase reforming of lighter oxygenated hydrocarbons compared to reforming of alkanes having the same carbon number is actually even more significant than as presented in FIG. 4. In particular, the values of $\Delta G°/RT$ used to construct plots 10 and 12 of FIG. 4 do not take into account the WGS reaction. That is, the $\Delta G°/RT$ values plotted in FIG. 4 assume that the product mixture is $H_2$ and CO, rather than $CO_2$. In other words, the $\Delta G°/RT$ values shown in FIG. 4 do not account for a subsequent WGS reaction, which will result in the production of still more hydrogen. As discussed above, the WGS reaction is more favorable at the lower temperatures appropriate for the steam reforming of oxygenated hydrocarbons. Thus, steam reforming of oxygenated hydrocarbons is a far more efficient reaction than the steam reforming reaction using the corresponding alkane.

The thermodynamic considerations summarized in FIG. 4 show that it is possible to conduct the vapor-phase steam reforming of methanol, ethanediol and glycerol at significantly lower temperatures as compared to the corresponding alkanes having the same number of carbon atoms.

While this low-temperature advantage does not exist for the vapor-phase steam reforming of sorbitol, unlike hexane, sorbitol is readily obtained from a renewable resource (i.e., glucose). In contrast, hexane is derived from non-renewable petroleum. Therefore, the vapor-phase steam reforming of sorbitol has very important environmental and long-term use advantages as compared to using hexane.

Another aspect of the invention also is revealed by a close inspection of FIG. 4 and that is that the advantages of producing $H_2$ from steam reforming of sorbitol can be achieved more fully by conducting the reaction in the condensed liquid phase. By conducting the reforming reaction in the condensed liquid phase, rather than the gas phase, the need to vaporize the reactant is eliminated. (Thus, the energy required to surmount the heat of vaporization of the reactants is likewise eliminated.) In the case of sorbitol in particular, liquid-phase reforming of sorbitol can be carried out at a temperature that is roughly 360 K lower than the temperature required to reform hexane in the condensed liquid phase.

Using reforming of oxygenated hydrocarbons (either in the vapor phase or the condensed liquid phase), it becomes possible to produce $H_2$ from carbohydrate feedstocks, such as glucose and corn starch, that have limited volatility. For example, the reforming of glucose would proceed according to reaction (11):

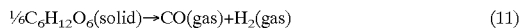

$$\tfrac{1}{6}C_6H_{12}O_6(solid) \rightarrow CO(gas) + H_2(gas) \tag{11}$$

The thermodynamic behavior for the reforming of glucose thus is similar to (even perhaps identical to) that for the reforming of other oxygenated hydrocarbons having a carbon-to-oxygen ratio of 1:1.

The liquid phase reforming of starch to produce $H_2$ would first involve the hydrolysis of starch to form glucose, followed by the reforming of glucose according to reaction (11). The thermodynamic properties for the hydrolysis reaction can be estimated from the conversion of diethyl-ether with water to form ethanol:

$$C_2H_5OC_2H_5 + H_2O \rightarrow 2C_2H_5OH \tag{12}$$

The value of $\Delta G°/RT$ per mole of ethanol formed in reaction (12) is slightly positive. This slightly unfavorable value, however, is more than compensated for by the more negative value of $\Delta G°/RT$ for reaction (11). Thus, at temperatures above 400 K, the thermodynamic behavior for the reforming of starch to form $H_2$ is very favorable. Further still, note that reaction (11) is based on the formation of 1 mole of CO, while reaction (12) represents the formation of 1 mole of glucose. Therefore, the value of $\Delta G°/RT$ for reaction (12) should be divided by 6 for comparison with the value of $\Delta G°/RT$ for reaction (11) This adjustment makes the thermodynamic properties for the reforming of starch to form $H_2$ even more favorable.

Taken in conjunction, the thermodynamic properties presented in FIGS. 2, 3, and 4, show that it is possible to conduct the reforming of glucose and starch at moderate temperatures (e.g., above about 400 K). Thus, steam reforming of carbohydrates in the condensed liquid phase provides a low-temperature alternative to the production of $H_2$ from petroleum. Furthermore, this low-temperature route for the production of $H_2$ from carbohydrates utilizes a renewable feedstock. This combination of low-temperature processing and utilization of renewable resources offers a unique opportunity for efficient and environmentally-benign energy generation.

Figure 5:
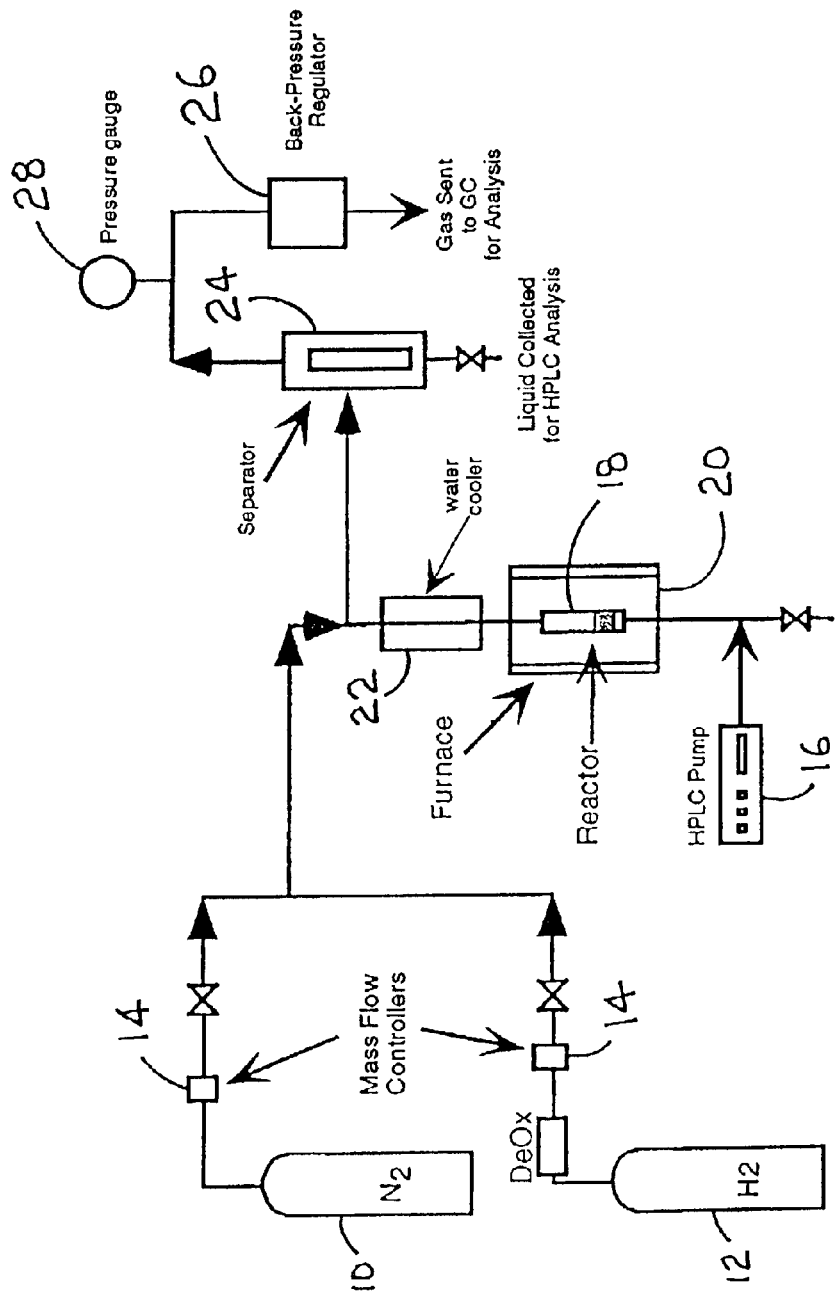
FIG. 5 is a schematic diagram of a reactor system that can be used to carry out the condensed liquid phase reforming of oxygenated hydrocarbons.

Reactor System:

An illustrative reactor system for carrying out the presently claimed method is depicted schematically in FIG. 5. Note that FIG. 5 illustrates an exemplary system. Many other reactor configurations could be utilized with equal success.

As shown in FIG. 5, a reactor 18 is disposed within a furnace 20. Liquid reactants are introduced into the reactor 18 via pump 16. As shown in the figure, the pump 16 is a small-scale, HPLC pump. (FIG. 5 depicts the prototype reactor that was used to conduct the experiments described in Examples 11 and 12.) Obviously, for full-scale hydrogen production, a much larger pump would be utilized.

Nitrogen supply 10 and hydrogen supply 12 are provided to maintain the overall pressure of the system and the partial pressure of hydrogen within the system chambers in and downstream of the reactor 18. Mass flow controllers 14 are provided to regulate the introduction of nitrogen and hydrogen into the system.

A heat exchanger 22 is provided to reduce the temperature of the products exiting the reactor 18. As shown in FIG. 5, the heat exchanger is a water cooler, but any type of heat exchanger will suffice. The products are then swept into separator 24. The design of the separator is not critical to the function of the invention, so long as it functions to separate gaseous products from liquid products. Many suitable separators to accomplish this function are known in the art, including distillation columns, packed columns, selectively-permeable membranes, and the like. Pressure regulator 28 and back-pressure regulator 26 serve to monitor and maintain the pressure of the system within the set value or range.

In a typical condensed liquid phase reforming reaction according to the present invention, a suitable metal-containing catalyst, preferably a metal catalyst impregnated on a support such as silica, is placed into the reactor 18. The metal catalyst is then reduced by flowing hydrogen from 12 into the reactor at a temperature of roughly 498 K. The pressure of the system is then increased to 300 psig using nitrogen from 10. The pump 16 is then used to fill the reactor 18 with an aqueous solution of reactant oxygenated hydrocarbon (for example, sorbitol).

The liquid effluent from the reactor is then cooled in the heat exchanger 22 and combined with nitrogen flowing at the top of the separator. The gas/liquid effluent is then separated at 24. The product gas stream can then be analyzed by any number of means, with gas chromatography being perhaps the most easily implemented, in-line analysis. Likewise, the effluent liquid may also be drained and analyzed.

Figure 6:
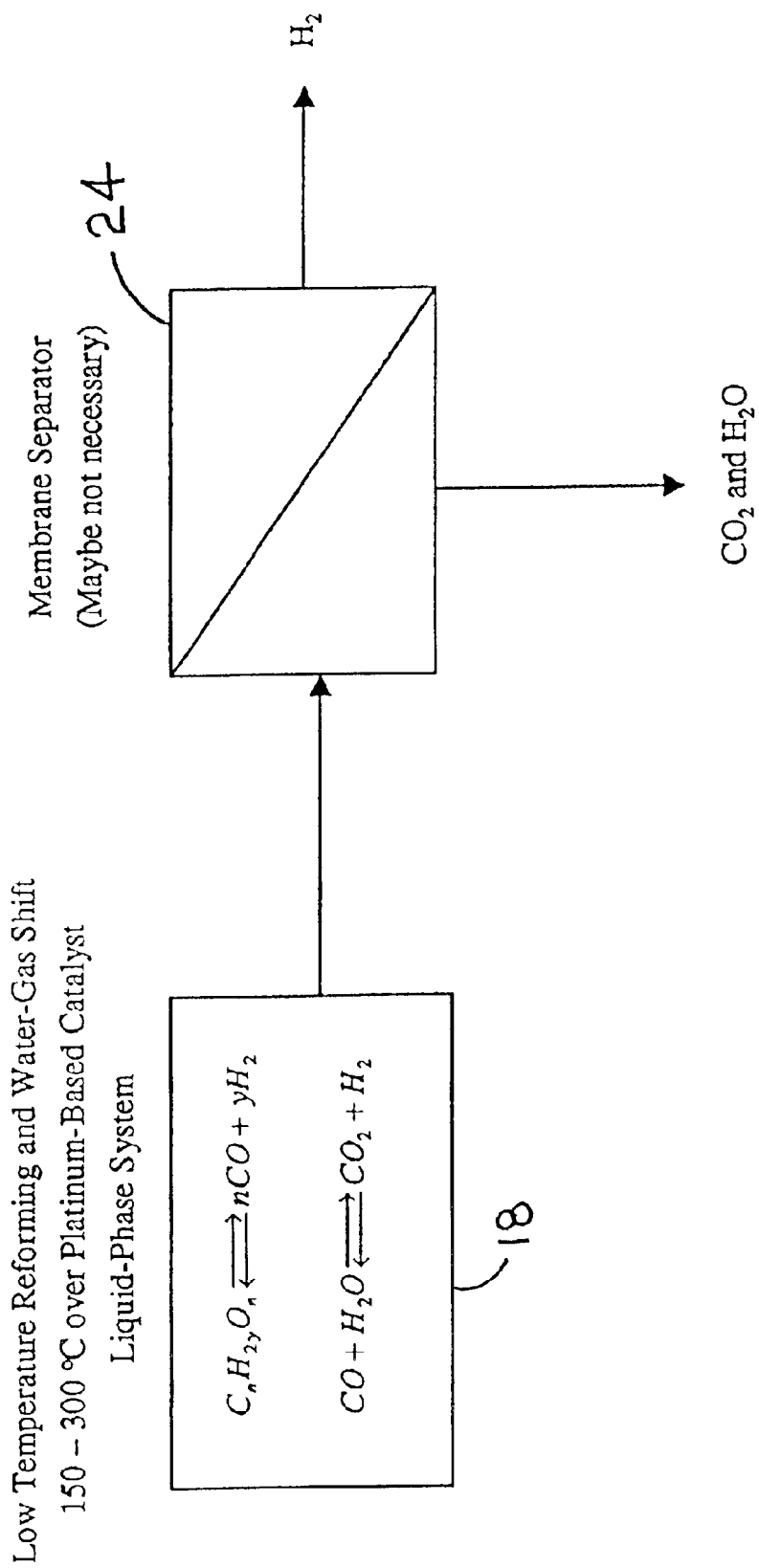
FIG. 6 is a schematic diagram of a one-reactor approach for reforming oxygenated hydrocarbons into CO and $H_2$, followed by a WGS reaction to maximize the production of $H_2$.

One of the primary advantages of the present invention is that it takes place at greatly reduced temperatures as compared to conventional steam reforming of hydrocarbons. Thus, the inventive method can be optimized to perform a steam reforming reaction and a WGS reaction simultaneously, in the same reactor, to yield a product comprised almost entirely of $H_2$, $CO_2$, and $H_2O$. This is shown schematically in FIG. 6. Here, a single-stage reactor 18 is shown, in which the reforming reaction and the WGS reaction take place simultaneously. The products are then swept into a separator 24 (shown in FIG. 6 as a membrane separator) where the hydrogen is separated from the $CO_2$ and the water. The hydrogen so produced can be used for any purpose where hydrogen is needed.

Thus, the liquid-phase reforming method of the present invention generally comprises loading a metallic catalyst into a reactor and reducing the metal (if necessary). An aqueous solution of the oxygenated hydrocarbon is then introduced into the reactor and the solution is reformed in the presence of the catalyst. The pressure within the reactor is kept sufficiently high to maintain the water and oxygenated hydrocarbon in the condensed liquid phase at the selected temperature. The resulting CO is then converted to additional hydrogen and carbon dioxide via a WGS reaction, a reaction that can occur within the same reactor. It is also possible that the catalyst may convert the reactant to $CO_2$ and $H_2$ without passing through a CO intermediate. The vapor-phase reforming method of the invention proceeds in essentially the same fashion, with the exception that the reactants are allowed to vaporize and the reaction takes place in the gas phase, rather than in the condensed liquid phase.

Oxygenated Hydrocarbons:

Oxygenated hydrocarbons that can be used in the present invention are those that are water-soluble and have at least two carbons. Preferably, the oxygenated hydrocarbon has from 2 to 12 carbon atoms, and more preferably still from 2 to 6 carbon atoms. Regardless of the number of carbon atoms in the oxygenated hydrocarbon, it is much preferred that the hydrocarbon has a carbon-to-oxygen ratio of 1:1.

Preferably, the oxygenated hydrocarbon is a water-soluble oxygenated hydrocarbon selected from the group consisting of ethanediol, ethanedione, glycerol, glyceraldehyde, aldotetroses, aldopentoses, aldohexoses, ketotetroses, ketopentoses, ketohexoses, and alditols. From among the 6-carbon oxygenated hydrocarbons, aldohexoses and corresponding alditols are preferred, glucose and sorbitol being the most preferred. From among the smaller compounds, ethanediol, glycerol and glyceraldehyde are preferred. Sucrose is the preferred oxygenated hydrocarbon having more than 6 carbon atoms.

Vapor phase reforming requires that the oxygenated hydrocarbon reactants have a sufficiently high vapor pressure at the reaction temperature so that the reactants are in the vapor phase. In particular, the oxygenated hydrocarbon compounds preferred for use in the vapor phase method of the present invention include, but are not limited to, ethanediol, glycerol, and glyceraldehyde. Where the reaction is to take place in the liquid phase, glucose and sorbitol are the most preferred oxygenated hydrocarbons. Sucrose is also a preferred feedstock for use in the liquid phase.

In the methods of the present invention the oxygenated hydrocarbon compound is combined with water to create an aqueous solution. The water-to-carbon ratio in the solution is preferably from about 2:1 to about 20:1. This range is only the preferred range. Water-to-carbon ratios outside this range are included within the scope of this invention.

It is much preferred that the water and the oxygenated hydrocarbon are reacted at a pH of from about 4.0 to about 10.0.

Catalysts:

As discussed above, the metallic catalyst to be used in the present method may be any system that is capable of cleaving the C—C bonds of a given oxygenated hydrocarbon compound faster than the C—O bonds of that compound under the chosen reaction conditions. Preferably, the metallic catalyst should have minimal activity toward the cleavage of C—O bonds. Use of a catalyst system having high activity for C—O bond cleavage can result in the formation of undesired by-products, such as alkanes.

The metallic catalyst systems preferred for use in the present invention comprise one or more Group VIIIB transitional metals, alloys thereof, and mixtures thereof, preferably (although not necessarily) adhered to a support. From among these metals, the most preferred are nickel, palladium, platinum, ruthenium, rhodium, and iridium, alloys thereof, and mixtures thereof. Platinum, ruthenium, and rhodium are the most preferred.

The Group VIIIB transition metal catalyst may optionally be alloyed or admixed with a metal selected from the group consisting of Group IB metals, Group IIB metals, Group VIIB metals, Group IVA metals, and Group VA metals. The amount of these added metals should not exceed about 30% of the weight of the Group VIIIB transition metal catalyst present. The preferred optional metals for inclusion in the catalyst are copper, zinc, germanium, tin, bismuth, alloys thereof, and mixtures thereof.

If loaded onto a support, the metallic catalyst should be present in an amount of from about 0.25% to about 50% by total weight of the catalyst system (the weight of the support being included), with an amount of from about 1% to 30% by total weight being preferred.

If a support is omitted, the metallic catalyst should be in a very finely powdered state, sintered, or in the form of a metallic foam. Where a support is omitted, metal foams are preferred. Metal foams are extremely porous, metallic structures that are reasonably stiff (they are sold in sheets or blocks). They are very much akin in structure to open-cell foamed polyurethane. Gas passing through a metal foam is forced through an extremely tortuous path, thus ensuring maximum contact of the reactants with the metal catalyst. Metal foams can be purchased commercially from a number of national and international suppliers, including Recemat International B.V. (Krimpen aan den Ijssel, the Netherlands), a company that markets "RECEMAT"-brand metal foam. In the United States, a very wide variety of metal foams can be obtained from Reade Advanced Materials (Providence, R.I. and Reno, Nev.).

It is preferred, however, that a support be used. The support should be one that provides a stable platform for the chosen catalyst and the reaction conditions. The supports include, but are not limited to, silica, alumina, zirconia, titania, ceria, carbon, silica-alumina, silica nitride, and boron nitride. Furthermore, nanoporous supports such as zeolites, carbon nanotubes, or carbon fullerene may be utilized. From among these supports, silica is preferred.

The support may also be treated, as by surface-modification, to remove surface moieties such hydrogen and hydroxyl. Surface hydrogen and hydroxyl groups can cause local pH variations that adversely effect catalytic efficiency. The support can be modified, for example, by treating it with a modifier selected from the group consisting of silanes, alkali compounds, and alkali earth compounds. The preferred support is silica modified by treatment with trimethylethoxysilane.

Particularly useful catalyst systems for the practice of the invention include, but are not limited to: ruthenium supported on silica, palladium supported on silica, iridium supported on silica, platinum supported on silica, rhodium supported on silica, cobalt supported on silica, nickel supported on silica, iron supported on silica, nickel-palladium supported on silica, nickel-platinum supported on silica, and ruthenium-palladium supported on silica. Preferably, the catalyst system is platinum on silica or ruthenium on silica, with either of these two metals being further alloyed or admixed with copper, zinc, and/or rhenium.

The catalyst system that is most useful in the reforming reaction of a specific oxygenated hydrocarbon compound may vary, and can be chosen based on factors such as overall yield of hydrogen, length of activity, and expense. For example, in testing performed with respect to the vapor-phase reforming of ethanediol, the following results were obtained. At 250° C., 1 atm., and an $H_2O$-to-carbon molar ratio of 15, in the presence of various catalyst systems where the metal was supported on silica, the following ranking of metals was obtained in terms of initial $H_2$ yield and stability:

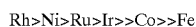

Rh>Ni>Ru>Ir>>Co>>Fe

The catalyst systems of the present invention can be prepared by conventional methods known to those in the art. These methods include evaporative impregnation techniques, incipient wetting techniques, chemical vapor deposition, magnetron sputtering techniques, and the like. The method chosen to fabricate the catalyst is not particularly critical to the function of the invention, with the proviso that different catalysts will yield different results, depending upon considerations such as overall surface area, porosity, etc.

The liquid phase reforming method of the present invention should generally be carried out at a temperature at which the thermodynamics of the proposed reaction are favorable. The pressure selected for the reactions varies with the temperature. For condensed phase liquid reactions, the pressure within the reactor must be sufficient to maintain the reactants in the condensed liquid phase.

The vapor-phase reforming method of the present invention should be carried out at a temperature where the vapor pressure of the oxygenated hydrocarbon compound is at least about 0.1 atm (and preferably a good deal higher), and the thermodynamics of the reaction are favorable. This temperature will vary depending upon the specific oxygenated hydrocarbon compound used, but is generally in the range of 100° C. to 450° C. for reactions taking place in the vapor phase, and more preferably from 100° C. to 300° C. for vapor phase reactions. For reactions taking place in the condensed liquid phase, the preferred reaction temperature should not exceed 400° C.

The condensed liquid phase method of the present invention may also optionally be performed using a salt modifier that increases the activity and/or stability of the catalyst system. Preferably, the modifier is a water-soluble salt of an alkali or alkali earth metal. The modified is added to the reactor along with the liquid reactants. It is preferred that the water-soluble salt is selected from the group consisting of an alkali or an alkali earth metal hydroxide, carbonate, nitrate, or chloride salt. If an optional modifier is used, it should be present in an amount from about 0.5% to about 10% by weight as compared to the total weight of the catalyst system used.

EXAMPLES

The following Examples are included solely to provide a more complete disclosure of the subject invention. Thus, the following Examples serve to illuminate the nature of the invention, but do not limit the scope of the invention disclosed and claimed herein in any fashion.

In all of the Examples, off-gas streams were analyzed with several different gas chromatographs (GCs), including a Carle GC with a "Porapak Q"-brand column (Waters Corp., Milford, Mass.) to determine hydrogen concentrations, an HP 5890 GC with a thermal conductivity detector and a "Porapak N"-brand column (Waters) to determine carbon monoxide, carbon dioxide, methane, and ethane concentrations, and the HP 5890 GC with a thermal conductivity detector and a "Hayesep D"-brand column (Hayes Separation Inc., Bandera, Tex.) to determine methane, ethane, propane, butane, pentane, and hexane concentrations. Total hydrocarbon and other volatile oxygenates were determined using an HP 6890 GC with a flame ionization detector and an "Innowax"-brand capillary column from Agilent Technologies, Palo Alto, Calif. (Note: Hewlett Packard's chromatography operations were spun off into Agilent Technologies, a wholly independent business, in 1999.)

Example 1

Silica-supported metal catalyst systems were prepared using an evaporative impregnation technique according to the following procedure: (1) Cab-O-Sil EH-5 fumed silica (Cabot Corporation, Woburn, Mass. USA) was dried for 24 hours at 393 K; (2) a solution containing the metal catalyst was added to the silica; and (3) the resulting catalyst was dried in air.

Example 2

A 4 wt % silica-supported ruthenium catalyst system ($Ru/SiO_2$) was prepared according to the general method of Example 1. A ruthenium (III) nitrosyl nitrate solution (1.5 wt % ruthenium solution) was added to the dried silica to produce a 4 wt % $Ru/SiO_2$ catalyst system. The mixture was stirred at room temperature for 30 minutes in an evaporation dish followed by heating to remove the excess liquid. The resulting catalyst system was then dried at 393 K in air overnight, and was then stored until testing.

Example 3

A 4 wt % silica-supported palladium catalyst system ($Pd/SiO_2$) was prepared according to the general method described in Example 1. A 10 wt % tetraamine palladium nitrate solution was diluted with water and then added to the dried silica to form a gel upon stirring. The gel was dried at room temperature for one day and further dried at 393 K overnight. The resulting $Pd/SiO_2$ catalyst system was then calcined in $O_2$ at 573 K for 3 hours.

Example 4

A 4 wt % silica-supported iridium catalyst system ($Ir/SiO_2$) was prepared according to the general method of Example 1. A dihydrogen hexachloroiridate (IV) solution was added to the dried silica to produce a 4 wt % $Ir/SiO_2$ catalyst system. The mixture was then stirred at room temperature for 30 minutes in an evaporation dish followed by heating to remove the excess liquid. The catalyst system was dried at 393 K in air overnight, and then stored until testing.

Example 5

A 5 wt % silica-supported platinum catalyst system ($Pt/SiO_2$) was prepared through the exchange of $Pt(NH_3)_4^{2+}$ with $H^+$ on the silica surface. The preparation procedure involved the following steps: (1) Cab-O-Sil EH-5 was exchanged with an aqueous $Pt(NH_3)_4(NO_3)_2$ solution (Aldrich Chemical, Milwaukee, Wis.) with the degree of exchange controlled by adjusting the pH of the silica slurry with an aqueous, basic solution of $Pt(NH_3)_4(OH)_2$; (2) the resulting material was filtered and washed with deionized water; and (3) and the filtered material was dried overnight in air at 390 K.

Example 6

Catalyst systems produced using the methods of Examples 1 and 5 were investigated for the vapor-phase reforming of an aqueous ethanediol solution in the presence of water. In these investigations, 0.1 g of a specific catalyst system was loaded into a glass reactor and reduced for 8 hours at 450° C. in flowing hydrogen before being used. A 10 wt % ethanediol solution in water was introduced via a syringe pump at a rate of 0.2 cc/h to a heated line of flowing helium (100 sccm). The reaction mixture of ethanediol and water was passed through a preheat section to vaporize the aqueous ethanediol solution and then over the catalyst bed at temperatures between 275° C. and 300° C. The partial pressure of ethanediol was 0.001 atm and the water-to-carbon molar ratio was 15 to 1.

The resulting gases were analyzed via an online GC equipped with a thermal conductivity detector. For these tests, the GC utilized a helium carrier gas to maximize the detection of the carbon-containing products. In this mode, it was not possible to detect hydrogen directly, so the hydrogen production was determined indirectly from the amounts of CO, $CO_2$, and $CH_4$ produced using the following equations:

1.5 moles of $H_2$ produced per mole of product CO 2.5 moles of $H_2$ produced per mole of product $CO_2$ 2.0 moles of $H_2$ consumed per mole of product $CH_4$ Table 1 shows the effects of metal type on the conversion of ethanediol and product ratio of the carbon containing products. This table shows that at 275° C., the ruthenium catalyst system completely converted the ethanediol to $CO_2$, indicating that ruthenium not only effectively cleaves the C—C bond of ethanediol, but also is an effective WGS reaction catalyst. Ethanediol was also completely converted over both the platinum and palladium catalyst systems at 275° C., but these metals were not as effective for the WGS reaction. The iridium catalyst system was not as effective for the complete conversion of ethanediol to $H_2$ at 275° C. However, elevating the temperature of the iridium-catalyzed reaction to 300° C. was sufficient to accomplish complete conversion.

TABLE 1

Effect of Catalyst on Steam Reforming of Ethanediol. (Total pressure = 1 atm, ethanediol partial pressure = 0.001 atm, water:carbon ratio = 15.5, GHSV = 72 std liter ethanediol feed per kg catalyst per h.)

| Catalyst | Temperature (° C.) | Conversion (%) | Carbon Containing Product Ratio (%) | | |
|---|---|---|---|---|---|
| | | | CO | Methane | $CO_2$ |
| 4% Ru/$SiO_2$ | 275 | 100 | 0 | 0 | 100 |
| 4% Pt/$SiO_2$ | 275 | 100 | 37.3 | 0 | 62.7 |
| 4% Pd/$SiO_2$ | 275 | 100 | 100 | 0 | 0 |
| 4% Ir/$SiO_2$ | 300 | 100 | 22.2 | 0 | 77.8 |

Example 7

The 4 wt % Ru/$SiO_2$ catalyst system produced using the method of Example 2 was investigated for the vapor-phase reactions of ethanediol in the presence of water with and without the addition of hydrogen gas in the feed. In the reactions of this Example, 0.5 g of the catalyst system was loaded into a glass reactor and reduced for 8 hours at 450° C. in flowing hydrogen before being used. A solution of 10 wt % ethanediol in water was injected into a heated line and vaporized before the reactor via a HPLC pump at a rate of 3.6 cc/h. At this feed rate, the gas hourly space velocity (GHSV) was 260 std liter of ethanediol per kg catalyst per hour. The water-to-carbon molar ratio was 15:1. The vaporized aqueous solution was then passed over the Ru/$SiO_2$ catalyst system at a temperature of 300° C. at 1 atm. The liquid product was condensed and the ethanediol concentration was analyzed via GC.

This same reaction was then repeated verbatim, with the sole exception that hydrogen was added to the feed at a rate of 3 moles hydrogen per 15 moles of $H_2O$ per 1 mole of carbon (i.e., 3:15:1, $H_2$:$H_2O$:C).

Figure 7:
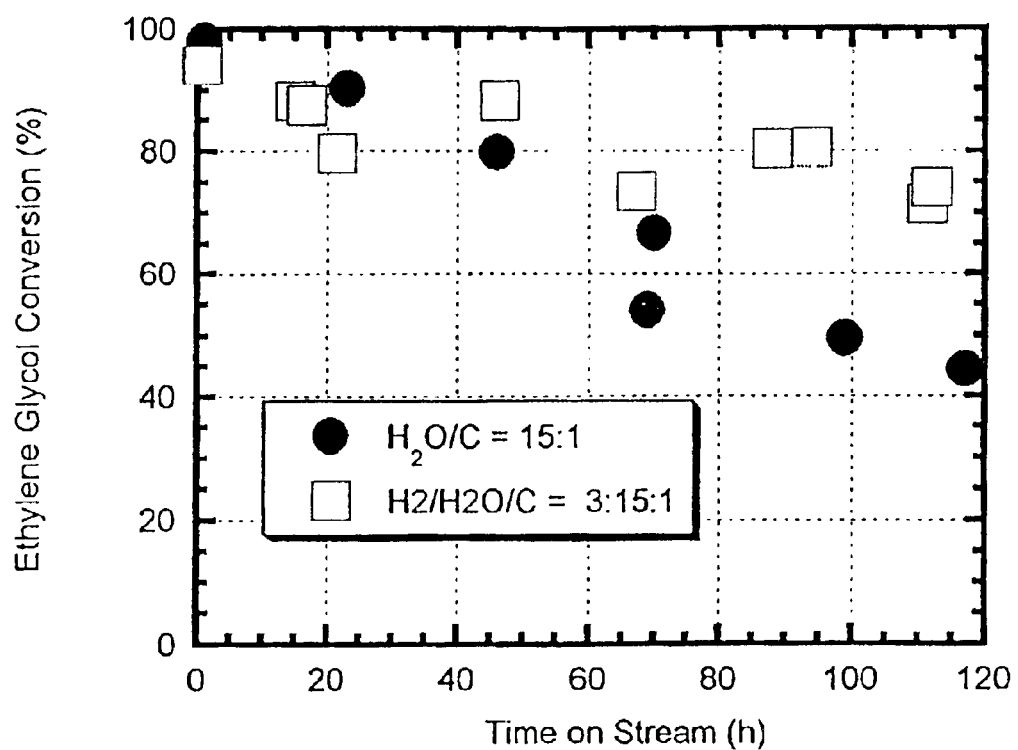
FIG. 7 shows the vapor-phase reforming of ethanediol over a 4 wt % $Ru/SiO_2$ catalyst system at 300° C. and 1 atm as detailed in Example 7.

The results are shown in FIG. 7, which shows the conversion of ethanediol as a function of time on stream. Table 2 shows the product ratio of the carbon-containing products for this Example at 1 hour and at 117 hours. Table 2 shows that at 1 hour, the primary product was $CO_2$. After 117 hours of operation, the product ratio to $CO_2$ decreased with a corresponding increase of the product ratio for CO. FIG. 7 shows that adding a hydrogen modifier to the reactor decreased the initial activity of the catalyst, but extended the useful operating life of the catalyst. FIG. 7 also shows that the conversion decreased from a high of 94% to 74% over the course of 112 hours. Table 2 shows that at 1 hour, CO was the primary carbon-containing product and that the product ratio to CO increased as the catalyst deactivated.

TABLE 2

Selectivity for the Steam Reforming of Ethanediol over 4 wt % Ru/$SiO_2$ at 300° C., 1 atm, and GHSV = 260 std liter of ethanediol per kg catalyst per h.

| Run Description | Time On Stream | Conversion % | Carbon Containing Product Ratio (%) | | | |
|---|---|---|---|---|---|---|
| | | | CO | $CO_2$ | $CH_4$ | $CH_3OH$ |
| No $H_2$ | 1 h | 98 | 1.3 | 96 | 2.7 | 0.04 |
| No $H_2$ | 117 h | 44 | 45.1 | 54.8 | 0.2 | 0.00 |
| $H_2$ in Feed | 1 h | 94 | 64.2 | 31.5 | 4.2 | 0.04 |
| $H_2$ in Feed | 66 h | 80 | 88.5 | 11.0 | 0.5 | 0.00 |

Example 8

Silica-supported monometallic and bimetallic catalyst systems were prepared by using the incipient wetting technique to add the given metal to the silica. The preparation procedure involved the following steps: (1) Cab-O-Sil EH-5 fumed silica was dried at 393 K; (2) the metal or metals were added to the silica by adding dropwise an aqueous solution of the appropriate metal precursor (approximately 1.5 gram of solution per gram of catalyst); and (3) the impregnated catalyst was dried at 393 K overnight. The catalyst systems were then stored in vials until testing.

Example 9

Silica-supported monometallic and bimetallic catalyst systems, made via the procedure of Example 8, were tested for the vapor-phase reforming of ethanediol (i.e., ethylene glycol). Ten milligrams of a given catalyst system was loaded into a glass reactor and reduced for 4 hours at 450° C. in flowing hydrogen before use in the reaction. An aqueous solution of 10-wt % ethanediol in water was introduced via a syringe pump at a rate of 0.2 cc/h to a heated line of flowing helium (50 sccm). The reaction mixture was passed through a preheat section to vaporize the aqueous ethanediol solution and then over the catalyst system at a temperature of 250° C. The partial pressure of ethanediol was 0.0023 atm and the water-to-carbon molar ratio was 15 to 1. The gases were analyzed via an online GC equipped with a TCD detector. At the low conversions of these investigations, CO was the only product detected. Accordingly, the production rate of CO was used to characterize both the activity and stability of the different metals. The results are shown in FIGS. 8, 9, 10, 11, and 12.

Figure 8:
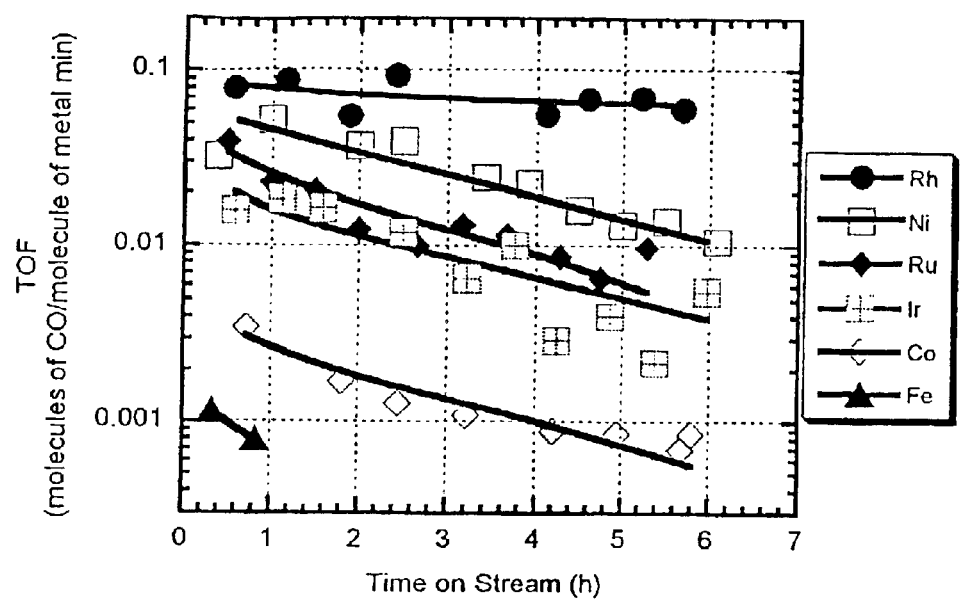
FIG. 8 shows the vapor-phase reforming of ethanediol at 250° C. and 1 atm, and a molar water-to-carbon ratio of 15 over mono-metallic catalyst systems containing Rh, Ni, Ru, Ir, Co, or Fe, as detailed in Example 9.

FIG. 8 shows the vapor-phase reforming of ethanediol at 250° C. and 1 atm, at a molar water-to-carbon ratio of 15 over monometallic catalyst systems containing Rh, Ni, Ru, Ir, Co, or Fe. This graph shows that for monometallic catalysts systems, Rh displays the best activity, followed by, in order of decreasing activity, Ni, Ru, Ir, Co, and Fe. In each of the catalyst systems tested, the catalyst contained 1 wt % of the metal on a silica support.

Figure 9:
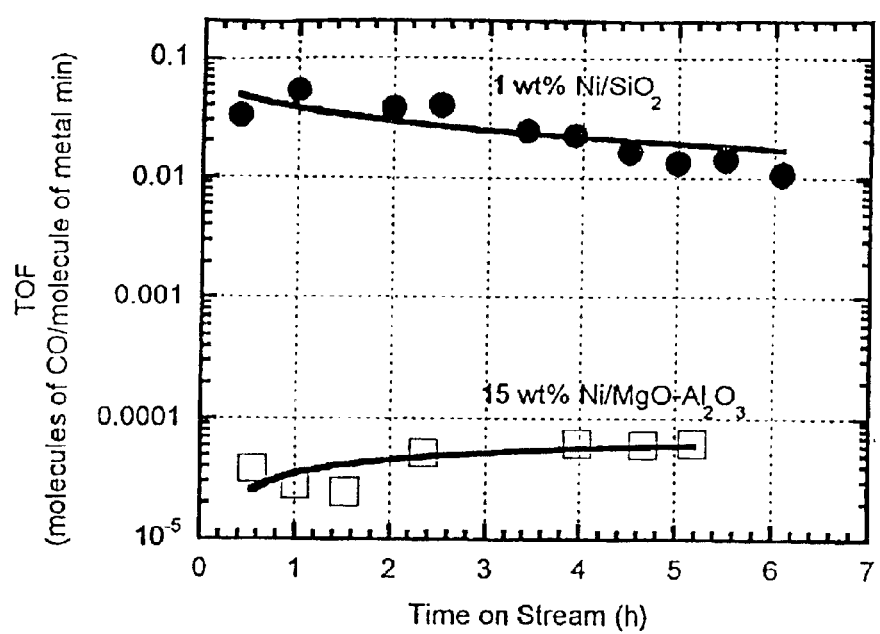
FIG. 9 shows vapor-phase reforming of ethanediol at 250° C. and 1 atm, and a water-to-carbon molar ratio of 15 over two different nickel catalyst systems (1 wt % $Ni/SiO_2$ and 15 wt % $Ni/MgO—Al_2O_3$), as detailed in Example 9.

FIG. 9 shows vapor-phase reforming of ethanediol at 250° C. and 1 atm, and a water-to-carbon molar ratio of 15 over two different nickel catalyst systems (1 wt % Ni/SiO$_2$ and 15 wt % Ni/MgO—Al$_2$O$_3$). These data show that the metal loading and the support chosen can have significant effects on catalytic activity. In FIG. 9, the closed circles represent molecules of CO per molecule of metal catalyst per minute for a 1 wt % Ni catalyst on a silica support. The open squares represent molecules of CO per molecule of metal catalyst per minute for a 15 wt % Ni catalyst on MgO—Al$_2$O$_3$. Quite clearly, this figure shows that the silica support is much preferred over the MgO—Al$_2$O$_3$ support.

Figure 10:
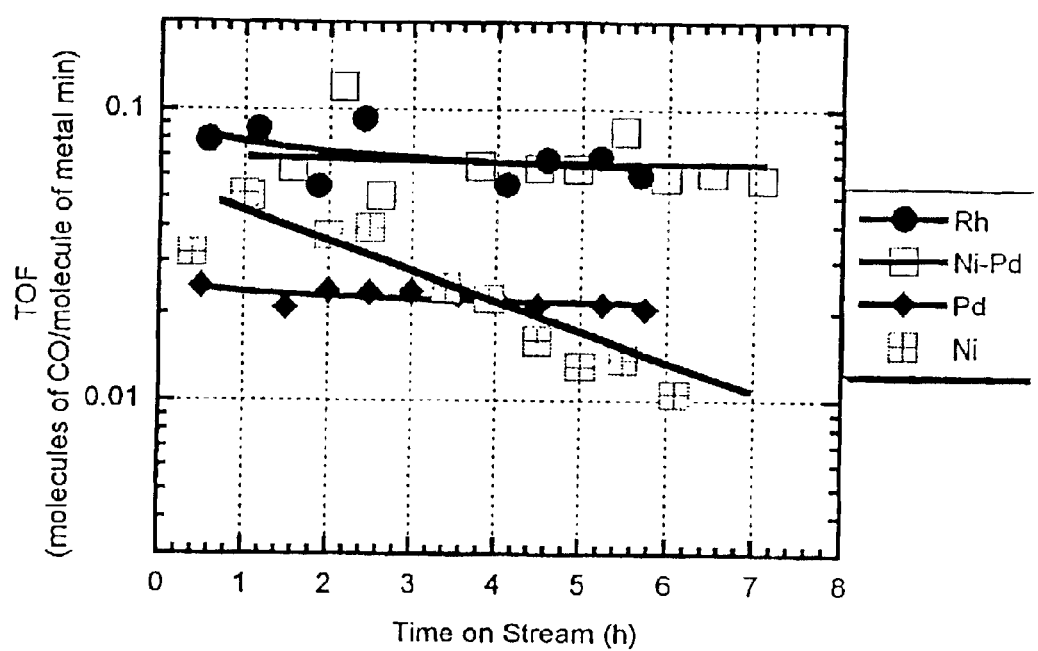
FIG. 10 shows the vapor-phase reforming of ethanediol at 250° C. and 1 atm, and a water-to-carbon ratio of 15 over a bimetallic catalyst system (Ni—Pd) as compared to mono-metallic $Rh/SiO_2$, Pd, and Ni catalyst systems, as detailed in Example 9.

FIG. 10 shows the vapor-phase reforming of ethanediol at 250° C. and 1 atm, at a water-to-carbon ratio of 15 over a bimetallic catalyst system (Ni—Pd) as compared to monometallic Rh/SiO$_2$, Pd, and Ni catalyst systems. Here, four distinct catalyst systems were tested: 1.0 wt % Rh/SiO$_2$, 1Ni—2Pd (0.5 wt % Ni)/SiO$_2$, 4.0 wt % Pd/SiO$_2$, and 1.0 wt % Ni/SiO$_2$. As shown in FIG. 10, the Rh and Ni—Pd catalyst systems had very similar activities and stabilities over the course of 7 hours. The Pd catalyst system had lower activity, but also exhibited a very constant activity over the course of the study. The Ni catalyst system had very good initial activity, but exhibited steadily declining activity over the 7-hour course of the experiment.

Figure 11:
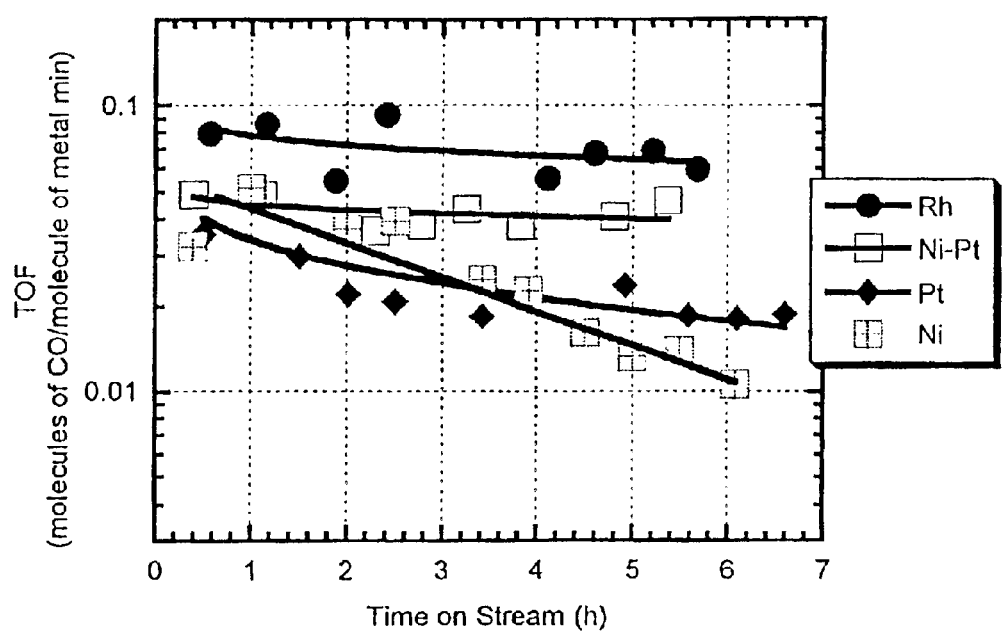
FIG. 11 shows the vapor-phase reforming of ethanediol at 250° C. and 1 atm, and a water-to-carbon ratio of 15 over various catalyst systems (Rh, Ni—Pt, Pt, and Ni), as detailed in Example 9.

FIG. 11 shows the vapor-phase reforming of ethanediol at 250° C. and 1 atm, at a water-to-carbon ratio of 15 over various catalyst systems (Rh, Ni—Pt, Pt, and Ni). Here, four distinct catalyst systems were tested: 1.0 wt % Rh/SiO$_2$, 1Ni—2Pt (0.5 wt % Ni)/SiO$_2$, 5.0 wt % Pt/SiO$_2$, and 1.0 wt % Ni/SiO$_2$. As shown in FIG. 11, the Ni catalyst system again had good initial activity, but exhibited steadily declining activity over the course of the experiment. The rhodium catalyst system exhibited high and steady activity over the course of the experiment, with the mixed Ni—Pt system exhibiting similar stability, but at a lower level of activity. The Pt catalyst system exhibited still lower activity and also showed steadily decreasing activity over time.

Figure 12:
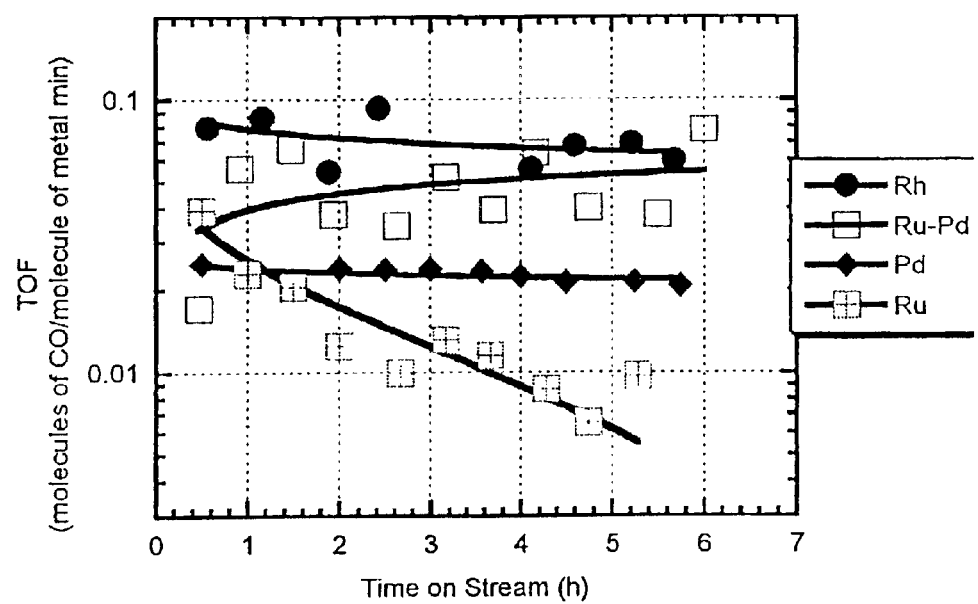
FIG. 12 shows the vapor-phase reforming of ethanediol at 250° C. and 1 atm, and a water-to-carbon ratio of 15 over various catalyst systems (Rh, Ru—Pd, Pd, and Ru), as detailed in Example 9.

FIG. 12 shows the vapor-phase reforming of ethanediol at 250° C. and 1 atm, at a water-to-carbon ratio of 15 over various catalyst systems (Rh, Ru—Pd, Pd, and Ru). Here, four distinct catalyst systems were tested: 1.0 wt % Rh/SiO$_2$, 1Ru—2Pd (1.0 wt % Ru)/SiO$_2$, 4.0 wt % Pd/SiO$_2$, and 1.5 wt % Ru/SiO$_2$. As in the earlier Examples, the Ru catalyst system again had good initial activity, but exhibited steadily declining activity over the course of the experiment. The Rh catalyst system exhibited the best activity, followed by the mixed Ru—Pd catalyst and the Pd catalyst. All three of these catalyst systems exhibited constant activity over the course of the experiment.

Example 10

Figure 13:
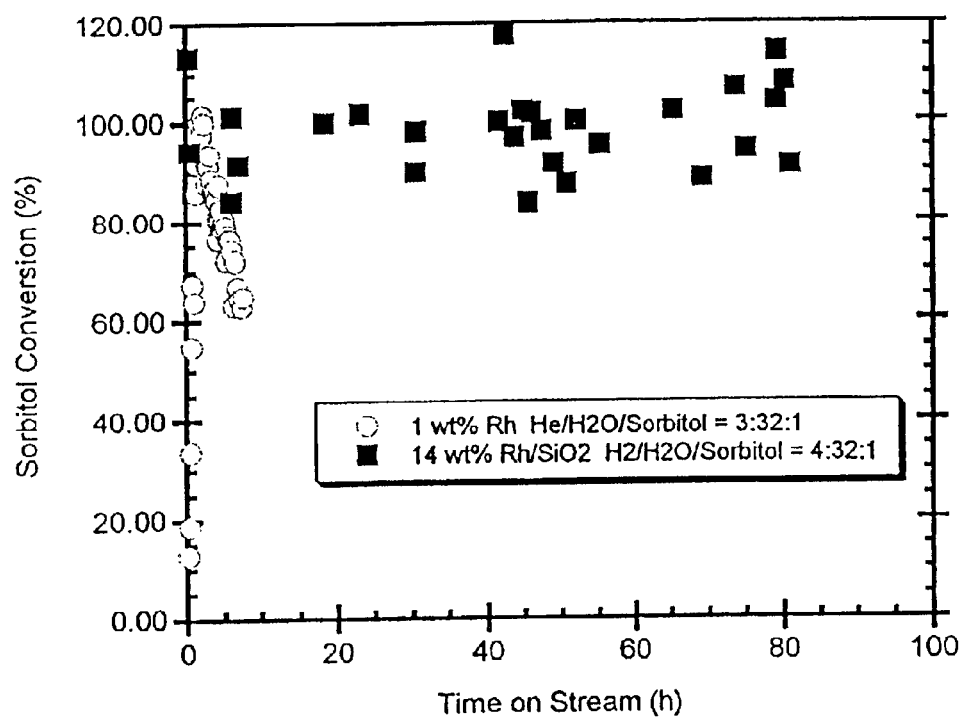
FIG. 13 shows the vapor-phase reforming of sorbitol at 425° C. and 1 atm, at a water-to-carbon ratio of 32 over silica-supported rhodium catalyst systems as detailed in Example 10.

The vapor-phase reforming of sorbitol with either a 1 wt % Rh/SiO$_2$ catalyst system or a 14 wt % Rh/SiO$_2$ catalyst system, prepared by the method of Example 1, was carried out at 425° C. and 1 atm, in the presence hydrogen. For this investigation, a 5 wt % sorbitol solution was fed to the system at 7.2 cc/h. One (1) gram of Rh catalyst was loaded into the reactor and pretreated with flowing hydrogen at 450° C. for 4 h. For this Example, a 5 wt % sorbitol solution was fed to the system at 7.2 cc/h and vaporized in either flowing helium or flowing hydrogen. Initially, the 1 wt % Rh/SiO$_2$ was utilized for the steam reforming of the 5 wt % sorbitol solution in the presence of helium such that the He:H$_2$O:C ratio was 3:32:1. Initially, the catalyst exhibited complete conversion of sorbitol to CO$_2$ and H$_2$ over this catalyst. FIG. 13 shows the conversion of sorbitol as determined by analyses of the reactor outlet gases. Conversion over 100% is attributed to experimental error in measuring flow rates of the partially condensable reactor outlet gas stream. FIG. 13 shows that after the initially observed complete conversion of the sorbitol, the conversion decreased quickly with time, indicating rapid deactivation of the catalyst.

It was then attempted to reform the 5 wt % sorbitol solution over a 14 wt % Rh/SiO$_2$ catalyst, with H$_2$ in the feed (H$_2$:H$_2$O:C=4/32/1). FIG. 13 shows that this 14 wt % Rh/SiO$_2$ catalyst completely converted the sorbitol for over 80 h of time with no indication of deactivation. GC analysis confirmed that the major products were carbon dioxide and hydrogen with trace amounts of methane and carbon monoxide.

Figure 14:
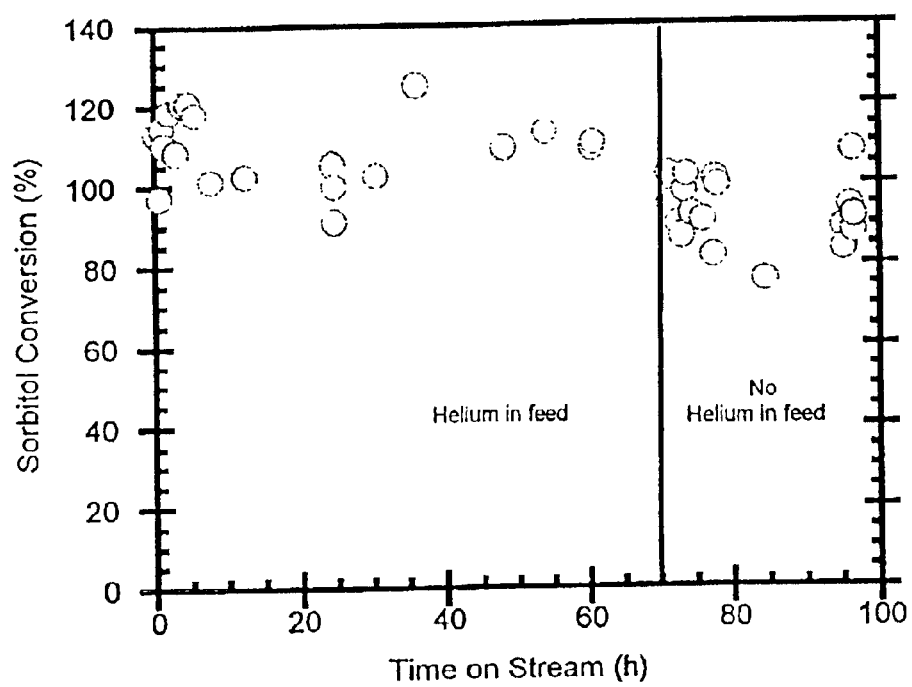
FIG. 14 shows the vapor-phase reforming of sorbitol at 425° C. and 1 atm, at a water-to-carbon ratio of 32 over silica-supported rhodium catalyst systems as detailed in Example 10, in the presence and absence of added helium.

The 14 wt % Rh/SiO$_2$ was catalyst was then treated in flowing hydrogen overnight at 450° C. and then used to reform a 10 wt % sorbitol solution in the presence of helium (He:H$_2$O:C=3:16:1) at 450° C. FIG. 14 shows that the 14 wt % Rh/SiO$_2$ completely converted the sorbitol for over 70 h. The helium sweep gas was removed after 70 h, and the catalyst continued to convert the sorbitol essentially completely. In this investigation, GC analyses showed only carbon dioxide was formed. The combined results shown in FIGS. 13 and 14 indicate that higher loadings of metal enhance the lifetime of the catalyst. These two figures also suggest that the silica support may be involved in the deactivation mechanism.

Example 11

A 5 wt % silica-supported platinum catalyst system was made according to the procedure described in Example 5. The catalyst was, however, modified by dehydroxylation and capping with trimethylethoxysilane. The catalyst system was prepared as follows: (1) fumed silica (Cab-O-Sil, EH-5 grade) was dried at 600 K for 10 hours under flowing helium; (2) platinum was added to the support by vapor-phase deposition of Pt(II) acetylacetonate at 500 K; (3) the resulting Pt/SiO$_2$ catalyst system was calcined at 600 K in flowing oxygen; (4) the calcined catalyst system was reduced at 600 K with flowing hydrogen; (5) the resulting catalyst system was dehydroxylated under flowing helium at 1173 K; (6) the catalyst system was treated with CO at 300 K to prevent the platinum sites from reacting with trimethylethoxysilane; (7) the resulting catalyst was dosed with 4.5 mmol trimethylethoxysilane (Gelest, Inc., Tullytown, Pa.) at 300 K; (8) the catalyst was dosed with CO until the residual pressure was 10 torr; (9) trimethylethoxysilane was dosed onto the catalyst at 473 K; and (10) the resulting catalyst system was calcined with flowing oxygen at 373 K. The catalyst system contained 70 $\mu$mol/g of surface platinum as determined by dosing with carbon monoxide at 300 K Example 12

Liquid phase reforming of sorbitol was performed using the metallic catalyst systems described in Examples 5 and 11. The apparatus used for the reforming is the apparatus depicted schematically in FIG. 5. The catalyst was loaded into a ¼ inch stainless steel reactor. The catalyst was reduced by flowing hydrogen across the catalyst at a temperature of 225° C. After reduction, the reactor was cooled. The system was then purged with nitrogen, and a HPLC pump was used to fill the reactor with a 10 wt % sorbitol aqueous solution. Once liquid was observed in the separator, the pressure of the system was increased to 300 psig with nitrogen (the pressure is controlled by the backpressure regulator 26; see FIG. 5). While the liquid feed was pumped over the catalyst bed, the furnace heated the bed to 225° C. The liquid exited the reactor and was cooled in a double-pipe water cooler (FIG. 5, reference number 22). The fluid from this cooler was combined with the nitrogen flow at the top of the cooler and the gas and liquid were separated in the separator 24.

The liquid was drained periodically for analysis, and the vapor stream passed through the back-pressure regulator 26. This off-gas stream was analyzed with several different GCs to determine the hydrogen concentration, the carbon monoxide, carbon dioxide, methane, and ethane concentrations, and the methane, ethane, propane, butane, pentane, and hexane concentrations. Total hydrocarbon and other volatile oxygenates were also determined by GC.

Figure 15:
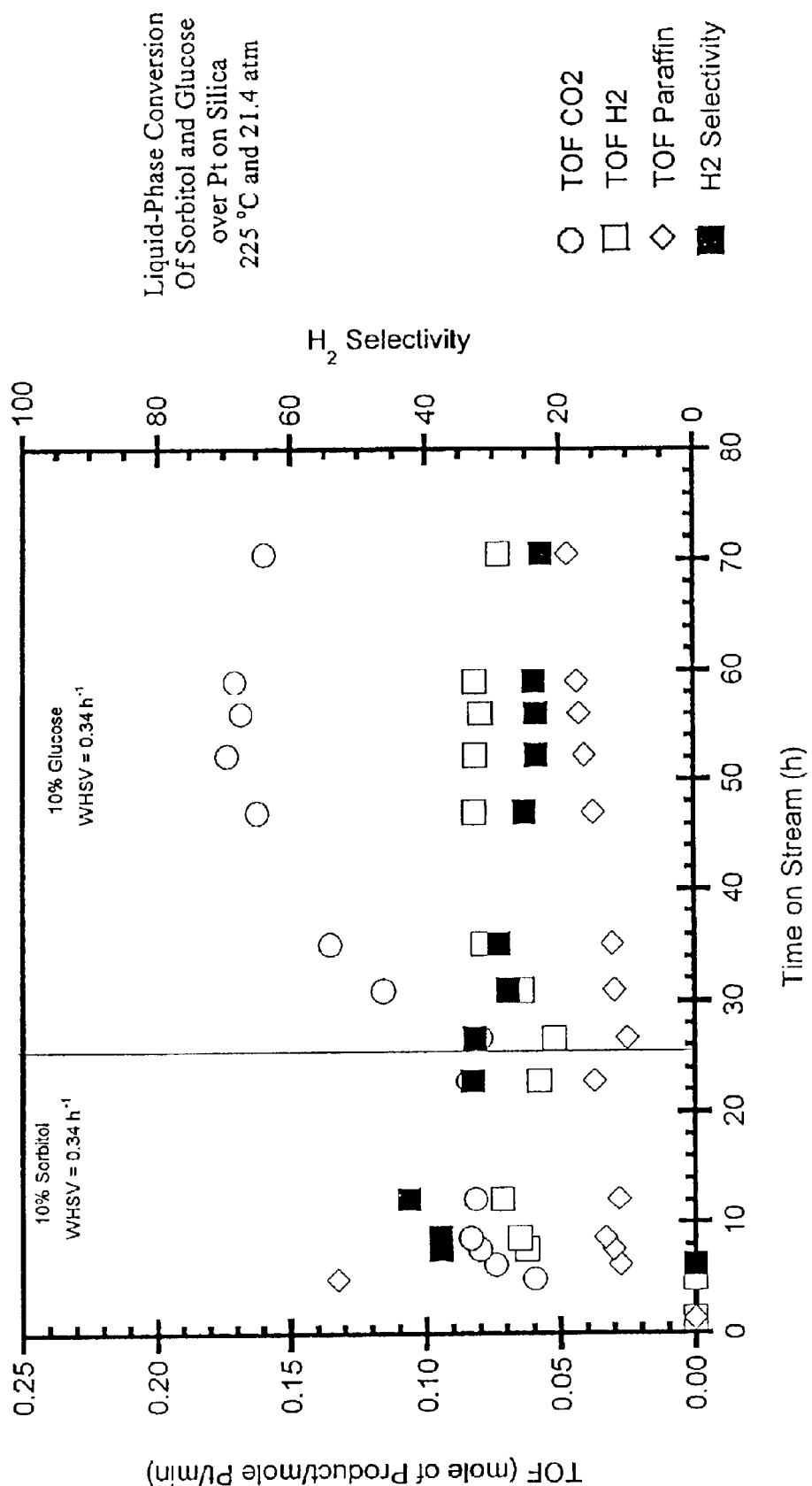
FIG. 15 shows the results for the condensed liquid phase reforming of a 10 wt % sorbitol solution over a 5 wt % $Pt/SiO_2$ catalyst system at 225° C., followed by liquid phase reforming of a 10 wt % glucose solution. See Example 12.

FIG. 15 shows the results for the liquid-phase conversion of a 10 wt % sorbitol solution over the 5 wt % $Pt/SiO_2$ catalyst system of Example 5 at 225° C. This figure shows the observed turnover frequencies (TOF, moles of product per mole of surface platinum per minute) for $CO_2$, $H_2$, and carbon found in paraffins. Additionally, FIG. 15 shows the hydrogen selectivity, which is defined as the observed hydrogen production divided by the hydrogen produced from the production of the observed $CO_2$ (13/6 $H_2$ per $CO_2$ observed). FIG. 15 shows that 33% $CO_2$ was observed in the off-gas. After 22 hours (indicated by the vertical line 10 in FIG. 15), the feed was switched to 10% glucose. FIG. 15 shows that the production of $CO_2$ increased without a significant change in the rate of hydrogen production. Accordingly, the $H_2$ selectivity decreased to 22% even after accounting for the lower theoretical yield of $H_2$ from glucose (13/6 $H_2$ per $CO_2$ observed).

Figure 16:
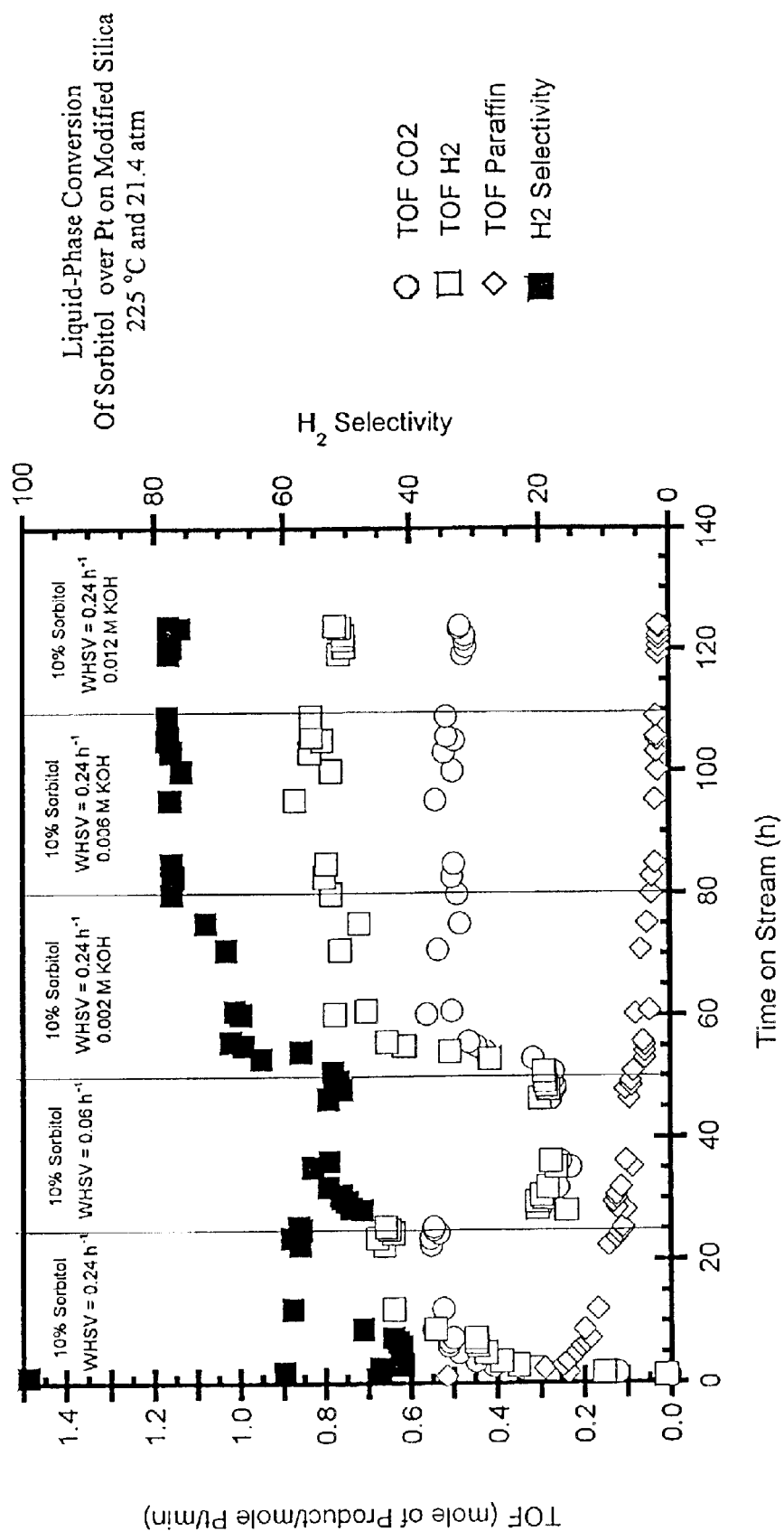
FIG. 16 shows the condensed liquid phase reforming of a 10 wt % sorbitol solution over a modified 5 wt % $Pt/SiO_2$ catalyst system. See Examples 11 and 12.

FIG. 16 shows the result for the liquid-phase conversion of a 10 wt % sorbitol solution at 225° C. over the 5 wt % $Pt/SiO_2$ catalyst that was defunctionalized by capping (see Example 11). This figure shows the observed turnover frequencies (moles of product per mole of surface platinum per minute) for $CO_2$, $H_2$, and carbon found in paraffins. Additionally, this figure shows the $H_2$ selectivity that again is defined as the observed hydrogen production divided by the hydrogen produced from the production of the observed $CO_2$. FIG. 16 shows that supporting platinum on the modified silica enhanced both the rates of production of $CO_2$ and $H_2$, as well as the $H_2$ selectivity. Importantly, this figure also shows that when KOH was added to the 10 wt % sorbitol solution, the rates of $H_2$ production increased and the rate of paraffin production decreased. Additionally, the $H_2$ selectivity increased with the addition of KOH in the liquid feed. Importantly, as the KOH concentration is increased from 0 M KOH to 0.006 M KOH, the $H_2$ selectivity increased from 57% to 77%. In addition, the rate of $H_2$ production increased from 0.65 $min^{-1}$ to 0.83 $min^{-1}$. This example clearly demonstrates that the -condensed liquid phase reforming of both glucose and sorbitol is possible.

The significance of all of the Examples given above is that they demonstrate that the vapor phase and condensed liquid phase reformation of oxygenated hydrocarbons to yield hydrogen is possible using a host of different types of Group VIII metal-containing catalysts.

Example 13

In Example 13, reaction kinetic studies were conducted for aqueous-phase reforming of ethylene glycol over silica-supported Ni, Pd, Pt, Ru, Rh and Ir catalysts at temperatures of 483 and 498 K and at a total pressure of 22 bar. The rates of production of hydrogen, carbon dioxide, carbon monoxide, methane, ethane and higher paraffins were measured for conversion of an aqueous feed solution containing 10 wt % ethylene glycol. It was observed that the overall catalytic activity for ethylene glycol reforming, as measured by the rate of $CO_2$ production at 483 K, decreases in the following order for silica-supported metals: Pt~Ni>Ru>Rh~Pd>Ir. Silica-supported Rh, Ru and Ni showed lower selectivity for production of $H_2$ and higher selectivity for alkane production. Silica-supported Pt and Pd catalysts exhibited relatively high selectivities for production of $H_2$, with low rates of alkane production. This Example thus shows that catalysts based on these metals, Pt and Pd in particular, are useful for the selective production of hydrogen by aqueous phase reforming of oxygenated hydrocarbons, such as ethylene glycol.

The catalysts used in Example 13 were prepared by evaporative deposition, ion-exchange, and incipient wetness impregnation. All catalysts were supported on "Cab-O-Sil"-brand fumed silica (Cabot Corporation, Grade EH-5). The Ru and Ni catalysts were prepared by evaporative deposition. A ruthenium (III) nitrosyl nitrate solution (1.5 wt % Ru solution in $H_2O$; from Strem Chemicals, Inc., Newburyport, Mass., USA) was used as the precursor for the Ru catalyst. The precursor used for depositing Ni on silica was nickel (II) nitrate hexahydrate (99.999%, Aldrich Chemical Company, Inc., Milwaukee, Wis., USA). In this procedure, the metal solution was added to the silica while stirring, and the water was evaporated at moderate temperature (e.g., 320 K). The catalyst was dried in an oven at 373 K overnight.

The Pd and Pt catalysts were prepared by ion exchange. The Pd precursor was a solution of tetraamine palladium (II) nitrate (5 wt % Pd in $H_2O$, Strem Chemicals, Inc.). The $SiO_2$ was stirred into this solution to form a slurry, and the pH was adjusted to 11.0 by adding concentrated ammonium hydroxide (28–30 wt % ammonia in water, Aldrich Chemical). The pH was continuously monitored and adjusted for 2 h, followed by filtration and washing with de-ionized water. The catalyst was then dried at 373 K overnight. The catalyst was subsequently calcined in 10% $O_2$ in He for 2 h at 530 K. The Pt catalyst was prepared in an identical manner, using tetraamine platinum nitrate $(Pt(NH4)_4(NO_3)_2$, Strem Chemicals, Inc.) as the precursor salt.

The Rh and Ir catalysts were prepared by incipient wetness impregnation. The solution used for preparation of $Rh/SiO_2$ was 10 wt % Rh in the form of rhodium (III) nitrate (Strem Chemicals, Inc.), and the solution used for making $Ir/SiO_2$ was 10 wt % Ir prepared from dihydrogen hexachloroiridate (IV) hydrate (Strem Chemicals, Inc.). The solutions were added drop-wise to the $SiO_2$ in an approximate ratio of 1.5 g of solution to 1.0 g of $SiO_2$. The catalysts were then dried overnight in an oven at 373 K.

The metal composition of each catalyst was measured by an inductively coupled plasma emission technique (ICPE) using a Perkin Elmer Plasma 400 ICP Emission Spectrometer after the catalyst was digested in acids. The irreversible CO uptake at 300 K was measured on a standard gas adsorption apparatus. Prior to CO adsorption measurements, the catalyst was reduced in flowing $H_2$ at 723 K (except for $Pd/SiO_2$, which was reduced at 533 K to minimize sintering). After reduction, the temperature was cooled to 673 K (except for Pd, for which the temperature was maintained at 533 K), and the $H_2$ was evacuated from the cell for 30 min. The cell was cooled to room temperature, and carbon monoxide was then dosed onto the catalyst in 5–10 doses until the equilibrium pressure was approximately 5 Torr. The gas in the cell was then evacuated for 30 minutes at room temperature to a pressure of $10^{-6}$ Torr, and CO was again dosed on the sample to determine the amount of reversibly adsorbed CO. The irreversible CO uptake was determined from subtracting the second isotherm from the first.

FIG. 5 shows the apparatus used to conduct reaction kinetics studies of the aqueous-phase reforming of ethylene glycol. The catalyst was loaded into a ¼ inch tubular stainless steel reactor. The temperature of the reactor was measured using a Chromomega®-Alomega® K-type thermocouple (Omega) attached to the outside of the reactor. The reactor was mounted in a tube furnace using ¼" connectors. Prior to the reaction kinetics studies, the fresh catalyst was reduced in flowing hydrogen (100 cm$^3$(STP)/min). The catalyst was heated, using a linear temperature ramp, to the final reduction temperature of 723 K (except for Pd/SiO$_2$, which was reduced at 533 K to minimize sintering) over 8 h, held at this temperature for 2 h and then cooled to room temperature, all in flowing hydrogen. Hydrogen (>99.99%) was purified by flowing through a bed of activated molecular sieves at room temperature. The flow-rate of hydrogen (and other gases) was fixed using calibrated mass-flow meters (Brooks Instruments). After reduction, the system was purged with flowing nitrogen and then pressurized to 22 bar with nitrogen. Nitrogen was purified by flowing through an OxyTrap (Alltech) followed by a bed of activated molecular sieves at room temperature. The system pressure was controlled by a backpressure regulator (GO Regulator, Model BP-60). An HPLC pump (Alltech, Model 301) was used to fill the reactor with an aqueous solution containing 10 wt % ethylene glycol (Aldrich, >99%). Once liquid was observed in the separator, the reactor was heated to 498 K over 1 h. The liquid flow-rate from the pump was set at 0.06 cm$^3$/min. The effluent from the reactor was water-cooled in a double-pipe heat exchanger to liquefy the condensable vapors. The fluid from this cooler was combined with the nitrogen make-up gas at the top of the cooler, and the gas and liquid were separated in the separator. The effluent liquid was drained periodically for total organic carbon (TOC) analysis (Shimadzu TOC-5000 analyzer with ASI-5000 autosampler and Balston 78-30 high purity TOC gas generator) and for detection of the primary carbonaceous species using gas chromatography (an HP 6890 GC with a FID detector and an HP Innowax capillary column).

The effluent gas stream passed through the back-pressure regulator. This off-gas stream was analyzed with several different gas chromatographs to determine the hydrogen concentration (a Carle GC with a TCD detector and a Porapak Q column in series with a Hayesep T column), the carbon monoxide concentration (a Shimadzu GC with a TCD detector and a Mol. Sieve 5A column), carbon dioxide, methane, and ethane concentrations (a HP 5890 GC with a TCD detector and a Porapak QS column), methane, ethane, propane, butane, pentane, and hexane (a HP 5890 GC with a TCD detector and a Hayesep D column), as well as the total hydrocarbon and other volatile oxygenates (a HP 6890 GC with a FID detector and an HP Innowax capillary column).

Table 3 shows the metal loadings for the silica-supported catalysts investigated in this Example. In addition, this table shows the irreversible extent of CO adsorption on each catalyst at room temperature, from which we calculate the ratio of adsorbed CO per metal atom (CO/M) for each catalyst. The CO/metal ratios of all catalysts are near 50%, except for the case of the high loading Ni/SiO$_2$ catalyst.

TABLE 3

Metal Loading and Irreversible CO Uptake on Silica-Supported Catalysts.

| Metal | Metal (wt %) | Irreversible CO Uptake (µmol/g) | CO/Metal (%) |
|---|---|---|---|
| Ru | 5.83 | 330 | 58 |
| Ir | 5.72 | 150 | 50 |
| Pd | 4.78 | 230 | 47 |
| Pt | 5.85 | 130 | 44 |
| Rh | 9.37 | 360 | 40 |
| Ni | 19.1 | 180 | 5.6 |

Figure 17:
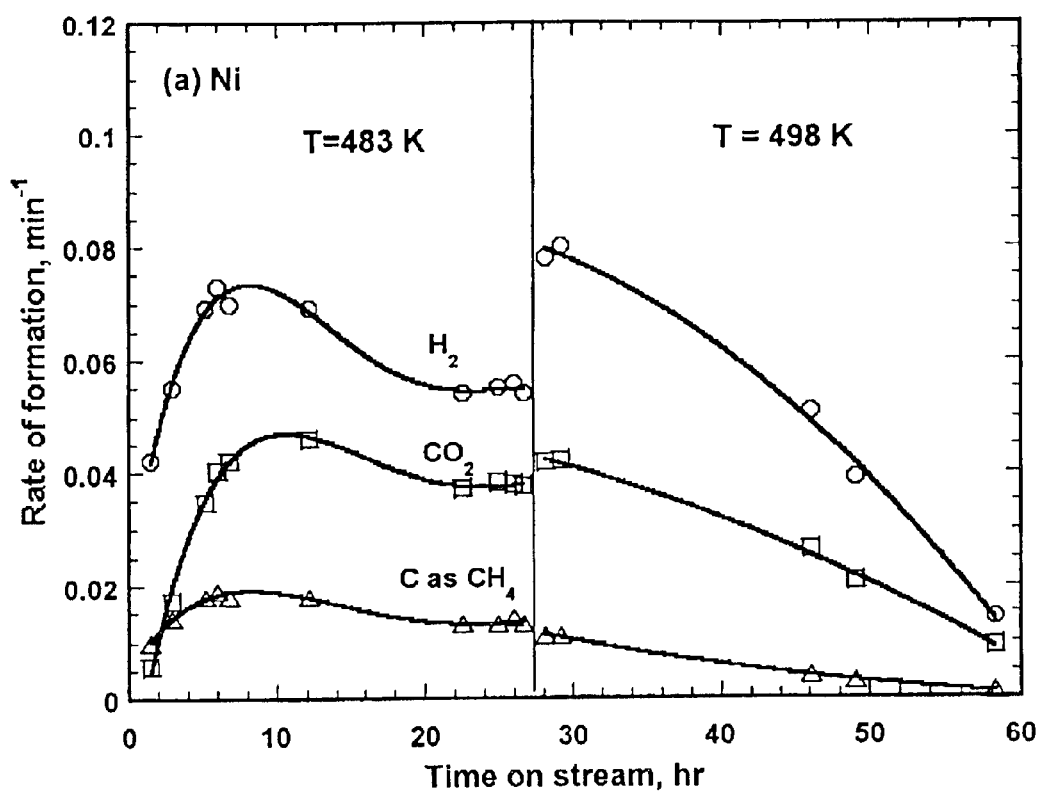
FIG. 17 is a graph depicting the Rates of formation ($min^{-1}$) of $CO_2$ (□), $H_2$ (○), C-atoms as alkanes ($CH_4$: △; $C_2H_6$: ◇; $C_3$+ alkanes: ⊠) over $Ni/SiO_2$ at 483 and 498 K, and 22 bar from the aqueous-phase reforming of ethylene glycol.
Figure 18:
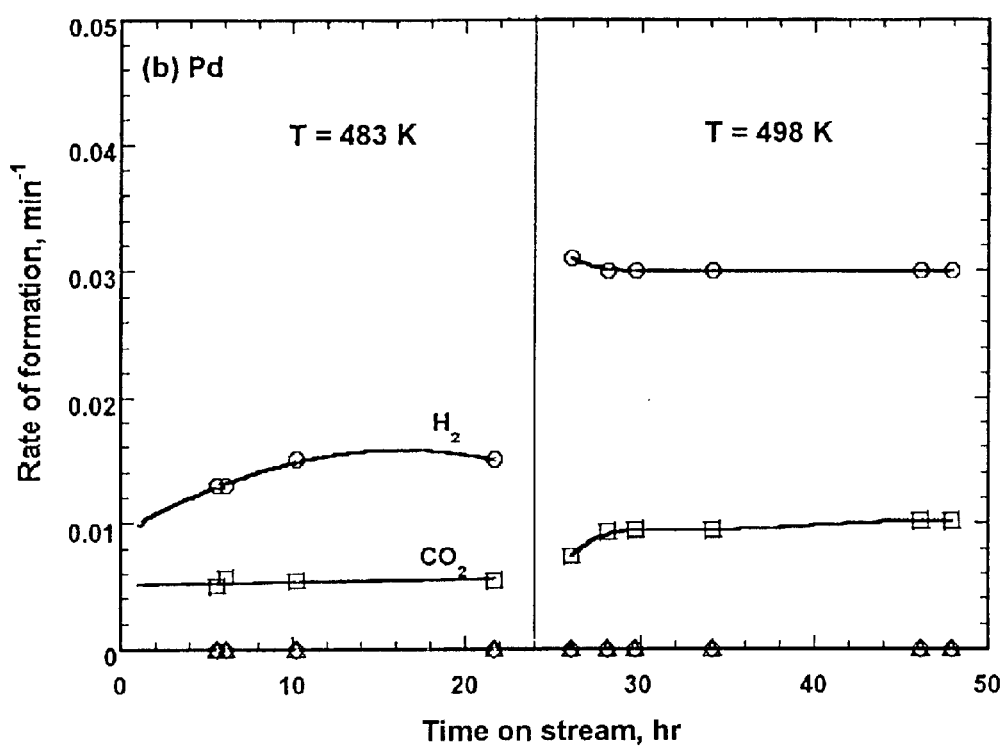
FIG. 18 is a graph depicting the rates of formation ($min^{-1}$) of $CO_2$ (□), $H_2$ (○), C-atoms as alkanes ($CH_4$: △; $C_2H_6$: ◇; $C_3$+ alkanes: ⊠) over $Pd/SiO_2$ at 483 and 498 K, and 22 bar from the aqueous-phase reforming of ethylene glycol.
Figure 19:
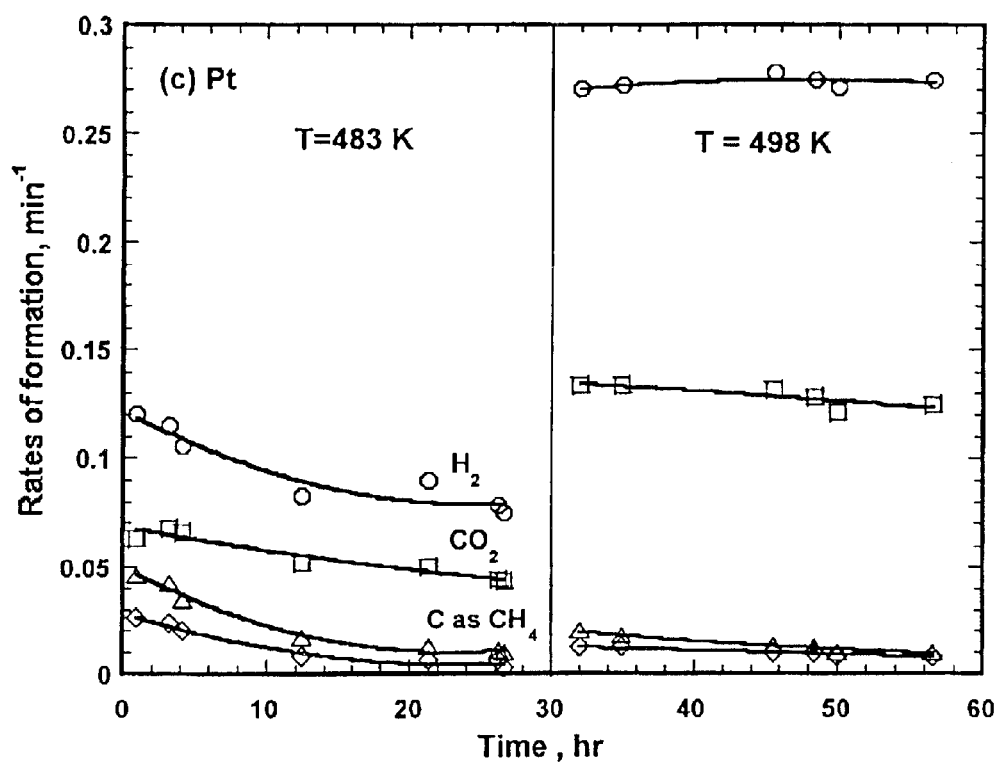
FIG. 19 is a graph depicting the rates of formation ($min^{-1}$) of $CO_2$ (□), $H_2$ (○), C-atoms as alkanes ($CH_4$: △; $C_2H6$: ◇; $C_3$+ alkanes: ⊠) over $Pt/SiO_2$ at 483 and 498 K, and 22 bar from the aqueous-phase reforming of ethylene glycol.
Figure 20:
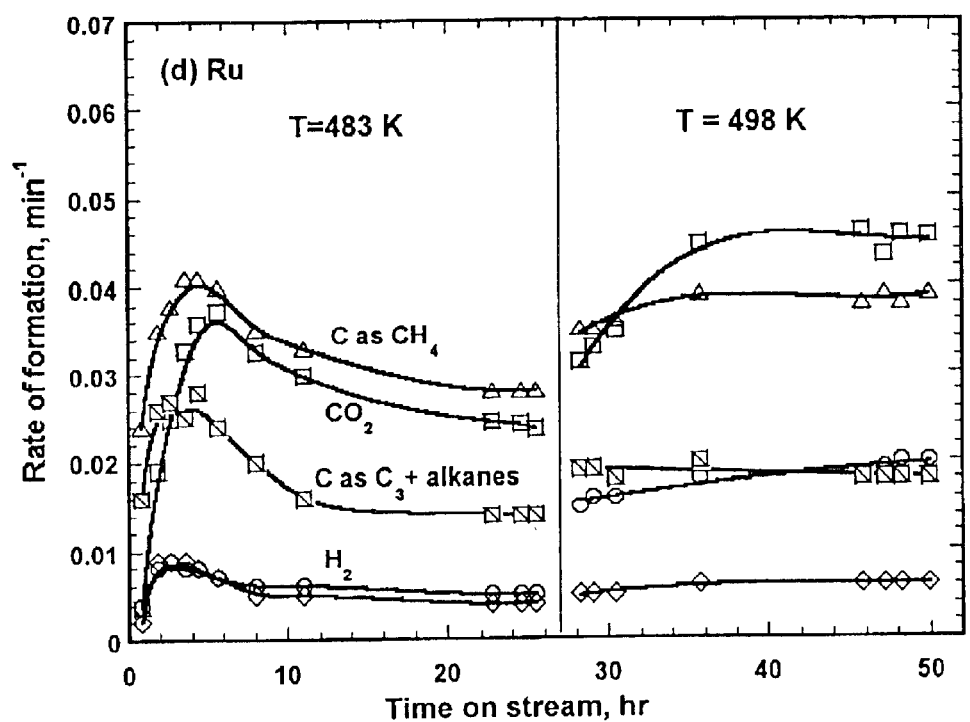
FIG. 20 is a graph depicting the rates of formation ($min^{-1}$) of $CO_2$ (□), $H_2$ (○), C-atoms as alkanes ($CH_4$: △; $C_2H_6$: ◇; $C_3$+ alkanes: ⊠) over Ru/SiO2 at 483 and 498 K, and 22 bar from the aqueous-phase reforming of ethylene glycol.
Figure 21:
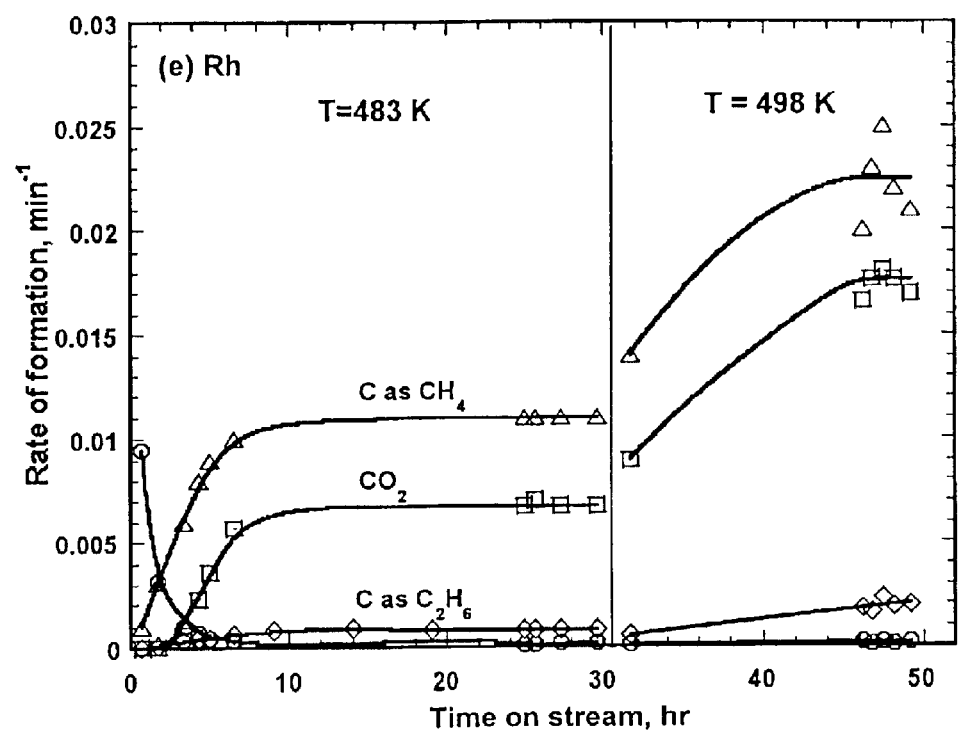
FIG. 21 is a graph depicting the rates of formation ($min^{-1}$) of $CO_2$ (□), $H_2$ (○), C-atoms as alkanes ($CH_4$: △; $C_2H_6$: ◇; $C_3$+ alkanes: ⊠) over $Rh/SiO_2$ at 483 and 498 K, and 22 bar from the aqueous-phase reforming of ethylene glycol.

The rates of formation of gaseous products (H$_2$, CO$_2$, C as CH$_4$, C$_2$H$_6$, and C$_3$+ alkanes) as a function of time on stream are shown for five metals in FIGS. 17 (Ni), 18 (Pd), 19 (Pt), 20 (Ru), and 21 (Rh). It can be seen that silica-supported Ni and Ru catalysts undergo deactivation with time on stream, see FIGS. 17 and 20, with the catalytic activity of Ni decreasing by a factor of 6 over 30 h time on stream. Silica-supported Pt (FIG. 19) shows some initial deactivation at the lower temperature, but it shows stable activity at the higher temperature. Silica-supported Rh (FIG. 21) and Pd (FIG. 18) exhibit stable catalytic activity versus time on stream.

Table 4 gives results for the aqueous-phase reforming of ethylene glycol to form H$_2$, CO$_2$ and alkanes at 483 and 498 K, over Ni, Pd, Pt, Ru and Rh supported on silica. This table shows the rates of production of H$_2$, CO$_2$, and moles of carbon in alkanes expressed as turnover frequencies, TOF (i.e., rates normalized by the number of surface metal atoms as determined from the irreversible uptakes of CO at 300 K). Detailed experimental data are not reported for Ir supported on silica, since this catalyst exhibited very low rates (lower than 0.004 min$^{-1}$ for production of CO$_2$) under the conditions of the present study. It can be seen that the overall rate of ethylene glycol reforming over the silica-supported metal catalysts at 483 K (as measured by the CO$_2$ production) decreases in the order:

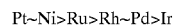

Pt~Ni>Ru>Rh~Pd>Ir

TABLE 4

Results for aqueous-phase reforming of ethylene glycol over silica-supported metal catalysts.

| Catalyst | 15% Ni/SiO$_2$ | | 4.9% Pd/SiO$_2$ | | 5% Pt/SiO$_2$ | | 5% Ru/SiO$_2$ | | 9.7% Rh/SiO$_2$ | |
|---|---|---|---|---|---|---|---|---|---|---|
| Temperature (K) | 483 | 498 | 483 | 498 | 483 | 498 | 483 | 498 | 483 | 498 |
| Pressure (bar) | 22 | 22 | 22 | 22 | 22 | 22 | 22 | 22 | 22 | 22 |
| % Conversion to Gas phase Carbon | 11.5 | 2.3* | 1.47 | 3.06 | 8.6 | 21.0 | 26.0 | 42.0 | 7.0 | 15.0 |

TABLE 4-continued

Results for aqueous-phase reforming of ethylene glycol over silica-supported metal catalysts.

| Catalyst | 15% Ni/SiO$_2$ | | 4.9% Pd/SiO$_2$ | | 5% Pt/SiO$_2$ | | 5% Ru/SiO$_2$ | | 9.7% Rh/SiO$_2$ | |
|---|---|---|---|---|---|---|---|---|---|---|
| H$_2$ TOF × 10$^3$ (min$^{-1}$) | 54 | 14 | 15 | 30 | 75 | 275 | 5 | 20 | 0.2 | 0.2 |
| CO$_2$ TOF × 10$^3$ (min$^{-1}$) | 37.5 | 9 | 5.5 | 10 | 43 | 125 | 24 | 46.4 | 6.8 | 16.9 |
| Alkane C TOF × 10$^3$ (min$^{-1}$) | 13 | 1 | 0.00 | 0.00 | 15 | 18 | 74 | 99 | 10.8 | 23 |
| % C as CH$_4$ in Alkanes | 100 | 100 | 0.00 | 0.00 | 66 | 56 | 37.8 | 39.4 | 92.6 | 91.3 |
| % C as C$_2$H$_6$ in Alkanes | 0.000 | 0.000 | 0.00 | 0.00 | 34 | 44 | 5.4 | 6.1 | 7.4 | 8.7 |
| C in C$_3$H$_8$ + TOF | 0.0 | 0.0 | 0.0 | 0.0 | 0.0 | 0.0 | 56.8 | 54.5 | 0.0 | 0.0 |
| % H$_2$ Selectivity | 42 | 57 | 98 | 98.5 | 52.5 | 77.9 | 3 | 7 | 0.34 | 0.17 |
| % Alkane Selectivity | 31 | 13 | 0 | 0 | 26.6 | 13.0 | 66 | 58 | 66 | 60 |

*Catalyst underwent deactivation.
Values reported are the final measured activities.

Hydrogen selectivity is reported in Table 4, which is defined as the number of moles of H$_2$ in the effluent gas normalized by the number of moles of H$_2$ that would be present if each mole of carbon in the effluent gas had participated in the ethylene glycol reforming reaction to give 5/2 moles of H$_2$. In addition, the alkane selectivity is reported, which is defined as the moles of carbon in the gaseous alkane products normalized by the total moles of carbon in the gaseous effluent stream. At 483 K, the H$_2$ selectivity for the metals range from 100% to nearly 0%, decreasing in the order:

Pd>Pt>Ni>Ru>Rh

The opposite trend is seen for the alkane selectivity, which increases in the following order for the metals:

Pd<Pt<Ni<Ru, Rh

On comparing the catalytic properties of the various metals in Table 4, it can be seen that Ni and Ru exhibit relatively high rates of CO$_2$ production, although their selectivities for production of H$_2$ are relatively low. Silica-supported Rh shows low selectivity for production of H$_2$, and the catalytic activity of this metal is also rather low. Finally, Pt and Pd show the highest selectivity for the formation of H$_2$, and it appears that Pt exhibits higher catalytic activity compared to Pd.

Under the conditions of the present study, relatively low levels of CO were produced compared to the amount of CO$_2$ formed from the aqueous-phase reforming of ethylene glycol. For example, ethylene glycol reforming over Pd resulted in CO/CO$_2$ ratios of 0.3; for Ni and Ru the ratios were about 0.05. Even lower amounts of CO were produced over Pt and Rh, with CO/CO$_2$ ratios lower than 0.004.

Analyses of the carbon-content of the effluent liquid from the aqueous-phase reforming of ethylene glycol indicated that the majority of the carbon (>95%) was present as unreacted ethylene glycol. Of the remaining carbon in the liquid effluent, the primary detected species were methanol, ethanol, acetaldehyde, and acetic acid.

An overall carbon balance of the system was achieved within 10% deviation from the carbon in the inlet stream. A small amount of the carbon may be deposited on the catalysts by coking reactions, which may have led to catalyst deactivation, especially for the case of Ni/SiO$_2$ at the higher temperature.

The rates shown in Table 4 for the aqueous-phase reforming of ethylene glycol over metal catalysts represent lower limits for the rates of aqueous-phase reforming reactions. This is because it is possible that the reactor system used in this Example was subject to transport limitations. These limitations are most important for the Pt catalyst, because this metal shows the highest reaction rates. In this respect, the presence of transport limitations for the most active catalysts (e.g., Pt) would serve to compress the range of turnover frequencies observed in this Example. At the higher temperature of the present Example (498 K), there might also be partial vaporization of the liquid phase.

The reactor system used in this Example included large volumes between the outlet of the tubular reactor and the separator, which led to long transient periods before the steady-state rate was achieved, as indicated in FIGS. 17–21. The time required for the reactor effluent (gas-liquid mixture) to reach the separator is on the order of five hours. In addition, the steady-state gas-phase CO$_2$ concentration is achieved after its solubility limit in water is reached. All of these physical factors contribute to the transient response of the system, and they tend obscure any transients caused by chemical/surface phenomena in the reactor. These parameters, of course, are easily rectified by limiting the volumes between the outlet and the separator.

This Example demonstrates that it is possible to achieve high catalytic activities and selectivities for the production of hydrogen via the present invention.

Example 14

This Example shows the effect that the support can have on the reaction kinetics. Initial studies were conducted using silica and defunctionalized silica as supports for the various metal catalysts. In this Example, liquid-phase reforming of ethylene glycol over platinum supported on a variety of substrates was performed. The results are shown in Table 5:

TABLE 5

Liquid-phase conversion of 10 wt % ethylene glycol in water as 23 bar and 210° C. Turnover frequencies based upon CO uptakes at 25° C.

| Catalyst | CO Uptake ($\mu$mol/g) | Conversion | Turnover Frequencies (moles product)/(moles surface Pt min) | | | | |
|---|---|---|---|---|---|---|---|
| | | | $H_2$ | $CO_2$ | $CH_4$ | $C_2H_6$ | CO |
| 10% Pt/ZnO | 2.30 | 0.89 | 1.157 | 0.152 | 0.0000 | 0.0000 | 0.0000 |
| 3.5% Pt/TiO$_2$ | 30.1 | 18.87 | 0.328 | 0.166 | 0.0035 | 0.0091 | 0.0000 |
| 3.5% Pt/Al$_2$O$_3$ | 80 | 14.33 | 0.275 | 0.116 | 0.0013 | 0.0004 | 0.0000 |
| 10% Pt/C | 88.6 | 8.07 | 0.176 | 0.100 | 0.0091 | 0.0044 | 0.0000 |
| 3.5% Pt/Zn/Al$_2$O$_3$ (40 wt % ZnO) | 12 | 0.83 | 0.106 | 0.023 | 0.0000 | 0.0000 | 0.0000 |
| 5% Pt/SiO$_2$ | 129 | 2.04 | 0.079 | 0.033 | 0.0030 | 0.0001 | 0.0000 |
| 3.5% Pt/SiO$_2$—Al$_2$O$_3$ | 130 | 8.61 | 0.011 | 0.013 | 0.0051 | 0.0039 | 0.0000 |

This table shows that platinum supported on silica is 3 to 5 times less active than platinum supported on alumina or titania. Furthermore, Table 5 shows that supporting platinum on zinc oxide yields the highest activity based on surface platinum sites with no hydrocarbon formed. It was found that if platinum is supported on alumina modified with zinc oxide, the zinc oxide reduces the number of surface platinum sites and lowers the production rates of hydrogen and carbon dioxide as compared to platinum on alumina. Importantly, it was observed that the addition of zinc oxide also improves the selectivity of the Pt/alumina system by decreasing the amount of hydrocarbons produced.

Example 15

This Example compares the reaction kinetics for the condensed-phase conversion of methanol and ethylene glycol over a 3.5 wt % Pt/alumina catalyst. As shown in Table 6, similar rates of hydrogen and $CO_2$ production were observed for the conversions of methanol and ethylene glycol at both 185 and 210° C. These results strongly suggest that breaking the C—C bond does not influence the reaction rate over this platinum-based catalyst.

TABLE 6

Reactivity of 3.5 wt % Pt/Al$_2$O$_3$ for the liquid-phase conversions of aqueous solutions of methanol and ethylene glycol at 22 bar. Turnover frequencies based on CO uptake at 25° C. (80 $\mu$mol Pt sites/g).

| Feed | Temperature (° C.) | Conversion | Turnover Frequencies (moles product)/(moles surface Pt min) | | | | |
|---|---|---|---|---|---|---|---|
| | | | $H_2$ | $CO_2$ | $CH_4$ | $C_2H_6$ | CO |
| 10 wt % MeOH | 185 | 1.82 | 0.017 | 0.0054 | 0 | 0 | 0 |
| 10 wt % MeOH | 210 | 10.3 | 0.243 | 0.0825 | 0.001 | 0 | 0 |
| 10 wt % EG | 185 | 0.7 | 0.013 | 0.0056 | 0 | 0 | 0 |
| 10 WT % EG | 210 | 14.3 | 0.274 | 0.116 | 0.001 | 0 | 0 |

Example 16

This Example investigated the complete conversion of methanol, ethylene glycol, glycerol, sorbitol, and glucose over Pt/Al$_2$O$_3$. Table 7 shows the experimental data for aqueous-phase reforming of glucose, sorbitol, glycerol, ethylene glycol, and methanol over the Pt/Al$_2$O$_3$ catalyst at 498 and 538 K. This table shows the fraction of the feed carbon that is detected in the effluent gas and liquid streams. It can be seen that a complete carbon balance has been achieved for all feed molecules, indicating that negligible amounts of carbon have been deposited on the catalyst. Table 7 also shows the compositions of the effluent gas streams from aqueous-phase reforming reactions. As in Example 13, the hydrogen selectivity is shown. Here, hydrogen selectivity is defined as the number of $H_2$ molecules that would be present of all of the carbon atoms in the effluent gas had participated in the reforming reaction to give 2, 13/6, 7/3, 5/2 or 3 molecules of $H_2$ for glucose, sorbitol, glycerol, ethylene glycol, and methanol respectively. Likewise, the alkane sensitivity is tabulated in Table 7. Again, alkane sensitivity is defined as the number of carbon atoms in the gaseous alkane products normalized by the total number of carbon atoms in the gaseous effluent stream.

Table 7 shows that the selectivity for production of $H_2$ improves in the order glucose<sorbitol<glycerol<ethylene glycol<methanol. It appears that higher selectivities for $H_2$ production may be achieved at lower temperatures. However, part of this effect may be caused by operating at lower conversions. Table 7 also shows that the selectivity for alkane production follows a trend with respect to reactant that is opposite to that exhibited by the $H_2$ selectivity. Gas streams from aqueous-phase reforming of the oxygenated hydrocarbons contain low levels of CO (i.e., less than 300 ppm), allowing these gas streams to be used with minimal CO clean-up for low temperature fuel cell applications.

TABLE 7

Experimental Data for Aqueous-phase Reforming of Glucose, Sorbitol, Glycerol, Ethylene Glycol and Methanol (1 wt % oxygenated hydrocarbon over 3% Pt supported on anno-fibers of γ-alumina)

|  | Glucose | | Sorbitol | | Glycerol | | Ethylene Glycol | | Methanol | |
| --- | --- | --- | --- | --- | --- | --- | --- | --- | --- | --- |
| Temperature (K) | 498 | 538 | 498 | 538 | 498 | 538 | 498 | 538 | 498 | 538 |
| Pressure (bar) | 27 | 54 | 27 | 54 | 27 | 54 | 27 | 54 | 27 | 54 |
| % Carbon in Gas-Phase Effluent | 50 | 84 | 61 | 90 | 83 | 99 | 90 | 99 | 94 | 94 |
| Gas Phase Composition | | | | | | | | | | |
| $H_2$ (mol %) | 51 | 46 | 61 | 54 | 64.8 | 57 | 70 | 68.7 | 74.6 | 74.8 |
| $CO_2$ (mol %) | 43 | 42 | 35 | 36 | 29.7 | 32 | 29.1 | 29 | 25 | 24.6 |
| $CH_4$ (mol %) | 4.0 | 7.0 | 2.5 | 6.0 | 4.2 | 8.3 | 0.8 | 2.0 | 0.4 | 0.6 |
| $C_2H_6$ (mol %) | 2.0 | 2.7 | 0.7 | 2.3 | 0.9 | 2.0 | 0.1 | 0.3 | 0.0 | 0.0 |
| $C_3H_8$ (mol %) | 0.0 | 1.0 | 0.8 | 1.0 | 0.4 | 0.7 | 0.0 | 0.0 | 0.0 | 0.0 |
| $C_4, C_5, C_6$ Alkanes (mol %) | 0.0 | 1.2 | 0.0 | 0.6 | 0.0 | 0.0 | 0.0 | 0.0 | 0.0 | 0.0 |
| % Carbon in Liquid-Phase Effluent | 51 | 15 | 39 | 12 | 17 | 2.8 | 11 | 2.9 | 6.5 | 6.4 |
| % $H_2$ Selectivity | 50 | 36 | 66 | 46 | 75 | 51 | 96 | 88 | 99 | 99 |
| % Alkane Selectivity | 14 | 33 | 15 | 32 | 19 | 31 | 4 | 8 | 1.7 | 2.7 |

What is claimed is:

1. A method of producing hydrogen via condensed-phase reforming, the method comprising: reacting water and a water-soluble oxygenated hydrocarbon, in the condensed phase, in the presence of a metal-containing catalyst, and wherein the catalyst comprises a metal selected from the group consisting of Group VIIIB transitional metals, alloys thereof, and mixtures thereof.

2. The method of claim 1, wherein the water and the oxygenated hydrocarbon are reacted at a temperature not greater than about 400° C., and at a pressure wherein the water and the oxygenated hydrocarbon remain condensed liquids.

3. The method of claim 1, wherein the water and the oxygenated hydrocarbon are reacted at a temperature not greater than about 300° C.

4. The method of claim 1, wherein the water and the oxygenated hydrocarbon are reacted at a pH of from about 4.0 to about 10.0.

5. The method of claim 1, wherein the catalyst comprises a metal selected from the group consisting of nickel, palladium, platinum, ruthenium, rhodium, iridium, alloys thereof, and mixtures thereof.

6. The method of claim 1, wherein the catalyst is further alloyed or mixed with a metal selected from the group consisting of Group IB metals, Group IIB metals, Group VIIB metals, Group IVA metals, and Group VA metals.

7. The method of claim 1, wherein the catalyst is further alloyed or mixed with a metal selected from the group consisting of copper, zinc, germanium, tin, and bismuth.

8. The method of claim 1, wherein the catalyst is adhered to a support.

9. The method of claim 8, wherein the support is selected from the group consisting of silica, alumina, zirconia, titania, ceria, carbon, silica-alumina, silica nitride, boron nitride, and mixtures thereof.

10. The method of claim 8, wherein the support is surface-modified to remove surface moieties selected from the group consisting of hydrogen and hydroxyl.

11. The method of claim 8, wherein the support is modified by treating it with a modifier selected from the group consisting of silanes, alkali compounds, and alkali earth compounds.

12. The method of claim 8, wherein the support is silica modified with trimethylethoxysilane.

13. The method of claim 8, wherein the support is a zeolite.

14. The method of claim 8, wherein the support is a carbon nanotube or a carbon fullerene.

15. The method of claim 8, wherein the support is a nanoporous support.

16. The method of claim 1, wherein the water and the oxygenated hydrocarbon are reacted at a temperature not greater than about 400° C., at a pressure where the water and the oxygenated hydrocarbon remain condensed, and further comprising reacting the water and the water-soluble oxygenated hydrocarbon in the presence of a water-soluble salt of an alkali or alkali earth metal.

17. The method of claim 16, wherein the water-soluble salt is selected from the group consisting of an alkali or an alkali earth metal hydroxide, carbonate, nitrate, or chloride salt.

18. The method of claim 1, wherein the water-soluble oxygenated hydrocarbon has a carbon-to-oxygen ratio of 1:1.

19. The method of claim 1, wherein the water-soluble oxygenated hydrocarbon has from 2 to 12 carbon atoms.

20. The method of claim 1, wherein the water-soluble oxygenated hydrocarbon is selected from the group consisting of methanol, ethanediol, ethanedione, glycerol, glyceraldehyde, aldotetroses, aldopentoses, aldohexoses, ketotetroses, ketopentoses, ketohexoses, and alditols.

21. The method of claim 1, wherein the water-soluble oxygenated hydrocarbon is methanol.

22. A method of producing hydrogen comprising: reacting water and methanol at a temperature not greater than about 400° C., at a pressure where the water and the methanol remain condensed liquids, and in the presence of a metal-containing catalyst, wherein the catalyst comprises a metal selected from the group consisting of Group VIIIB transitional metals, alloys thereof, and mixtures thereof, and the catalyst is adhered to a support.

23. The method of claim 22, wherein the catalyst comprises a metal selected from the group consisting of nickel, palladium, platinum, ruthenium, rhodium, iridium, alloys thereof, and mixtures thereof.

24. The method of claim 22, wherein the catalyst is further alloyed or mixed with a metal selected from the group consisting of Group IB metals, Group IIB metals, Group VIIB metals, Group IVA metals, and Group VA metals.

25. The method of claim 22, wherein the catalyst is further alloyed or mixed with a metal selected from the group consisting of copper, zinc, germanium, tin, and bismuth.

26. The method of claim 22, wherein the support is selected from the group consisting of silica, alumina, zirconia, titania, ceria, carbon, silica-alumina, silica nitride, boron nitride, and mixtures thereof.

27. The method of claim 22, wherein the support is surface-modified to remove surface moieties selected from the group consisting of hydrogen and hydroxyl.

28. The method of claim 27, wherein the support is modified by treating it with a modifier selected from the group consisting of silanes, alkali compounds, and alkali earth compounds.

29. The method of claim 28, wherein the support is silica modified with trimethylethoxysilane.

30. The method of claim 22, wherein the support is a zeolite.

31. The method of claim 22, wherein the support is a carbon nanotube or a carbon fullerene.

32. The method of claim 22, wherein the support is a nanoporous support.

33. The method of claim 22, further comprising reacting the water and the water-soluble oxygenated hydrocarbon in the presence of a water-soluble salt of an alkali or alkali earth metal.

34. The method of claim 33, wherein the water-soluble salt is selected from the group consisting of an alkali or an alkali earth metal hydroxide, carbonate, nitrate, or chloride salt.

35. The method of claim 22, wherein the water-soluble oxygenated hydrocarbon has a carbon-to-oxygen ratio of 1:1.

36. The method of claim 22, wherein the water-soluble oxygenated hydrocarbon has from 2 to 12 carbon atoms.

37. The method of claim 22, wherein the water-soluble oxygenated hydrocarbon is selected from the group consisting of methanol, ethanediol, ethanedione, glycerol, glyceraldehyde, aldotetroses, aldopentoses, aldohexoses, ketotetroses, ketopentoses, ketohexoses, and alditols.

38. The method of claim 22, wherein the water-soluble oxygenated hydrocarbon is selected from the group consisting of aldohexoses and corresponding alditols.

39. The method of claim 22, wherein the water-soluble oxygenated hydrocarbon is selected from the group consisting of methanol, ethylene glycol, glycerol, xylose, glucose, xylitol, and sorbitol.

40. The method of claim 22, wherein the water-soluble oxygenated hydrocarbon is sucrose.

* * * * *